(12) United States Patent
Pan et al.

(10) Patent No.: US 9,942,484 B2
(45) Date of Patent: Apr. 10, 2018

(54) ELECTRONIC DEVICE AND METHOD FOR DISPLAYING IMAGE THEREIN

(71) Applicant: Samsung Electronics Co., Ltd., Gyeonggi-do (KR)

(72) Inventors: Zhedan Pan, Gyeonggi-do (KR); Hyun-Young Kim, Gyeonggi-do (KR); Min-Jeong Moon, Seoul (KR); Beldagli Behram, Gyeonggi-do (KR); Sang-Il Lee, Gyeonggi-do (KR); Nam-Jin Kim, Gyeonggi-do (KR); Min-Kyung Hwang, Seoul (KR); Geon-Soo Kim, Gyeonggi-do (KR); Jeong-Hyun Pang, Gyeonggi-do (KR); Jens Gustaf Folke Oknelid, Malmo (SE); Jonas Ove Arbsjo, Malmo (SE); Maximilian Christian Olle Larsson, Malmo (SE); Nils Roger Andersson Reimer, Malmo (SE)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/180,864

(22) Filed: Jun. 13, 2016

(65) Prior Publication Data

US 2016/0366344 A1 Dec. 15, 2016

(30) Foreign Application Priority Data

Jun. 12, 2015 (KR) ........................ 10-2015-0083336

(51) Int. Cl.
*H04N 5/222* (2006.01)
*H04N 5/262* (2006.01)
(Continued)

(52) U.S. Cl.
CPC ......... *H04N 5/2621* (2013.01); *G06F 3/0482* (2013.01); *G06F 3/04845* (2013.01);
(Continued)

(58) Field of Classification Search
CPC ............. H04N 5/2621; H04N 5/23216; H04N 5/23293; H04N 1/6013; G06C 20/123;
(Continued)

(56) References Cited

U.S. PATENT DOCUMENTS 8,214,766 B1 7/2012 Berger et al.
2015/0172534 A1* 6/2015 Miyakawa ......... H04N 5/23216
348/222.1

FOREIGN PATENT DOCUMENTS

EP 2 634 751 9/2013
KR 10-0810254 3/2008
WO WO 2013/175784 11/2013

OTHER PUBLICATIONS

Samsung: "Samsung Galaxy Gear Mobile Device: User Manual", XP055308516, Oct. 26, 2013, 83 pages.
(Continued)

*Primary Examiner* — Yogesh Aggarwal
(74) *Attorney, Agent, or Firm* — The Farrell Law Firm, P.C.

(57) ABSTRACT

A method for displaying an image in an electronic device provided. The method includes displaying an image and if a filter effect list request is input, dividing at least a portion of the image into a plurality of filter areas, and displaying a preview image in which different filter effects are applied to the plurality of filter areas.

18 Claims, 37 Drawing Sheets

(51) Int. Cl.
  *G06F 3/0482* (2013.01)
  *G06F 3/0484* (2013.01)
  *G06Q 20/12* (2012.01)
  *G06T 5/20* (2006.01)
  *H04N 5/232* (2006.01)
  *H04N 1/60* (2006.01)

(52) U.S. Cl.
  CPC ............. *G06Q 20/123* (2013.01); *G06T 5/20* (2013.01); *H04N 1/6013* (2013.01); *H04N 5/23216* (2013.01); *H04N 5/23293* (2013.01); *G06T 2207/10016* (2013.01); *G06T 2207/20024* (2013.01)

(58) Field of Classification Search
  CPC ..... G06F 3/04845; G06F 3/0482; G06T 5/20; G06T 2207/10016; G06T 2207/20024
  USPC ........................................ 348/333.01–333.09
  See application file for complete search history.

(56) References Cited

OTHER PUBLICATIONS

European Search Report dated Oct. 17, 2016 issued in counterpart application No. 16174063.4-1903, 12 pages.

* cited by examiner

ELECTRONIC DEVICE AND METHOD FOR DISPLAYING IMAGE THEREIN

PRIORITY

This application claims priority under 35 U.S.C. § 119(a) to a Korean Patent Application Serial No. 10-2015-0083336, which was filed in the Korean Intellectual Property Office on Jun. 12, 2015, the entire disclosure of which is incorporated herein by reference.

BACKGROUND

1. Field of the Disclosure

The present disclosure relates generally to an electronic device, and more particularly, to a method for displaying an image in an electronic device.

2. Description of the Related Art

An electronic device such as a camera or a camcorder may change hardware setting values of an image sensor or convert image data corresponding to a selected image in response to the user's manipulation, thereby allowing a user to generate images in different atmospheres for the same image.

The electronic device provides a variety of filter effects that can be manipulated and selected by the user. These filter effects may include a shooting mode or an effect mode. The shooting mode may include, for example, a night scene shooting mode, a portrait shooting mode, or a scene shooting mode. The effect mode may include, for example, a clear filter mode, a soft filter mode, a sepia filter mode, a Lomographic (Lomo) filter mode, and a classic filter mode.

A method for applying the filter effects may be divided into a hardware method and a post-processing method. The hardware method changes hardware setting values which are set in a camera module (e.g., an image sensor) of the electronic device. Accordingly, the electronic device may generate an image, to which filter effects are applied, which is not a normal image, e.g., an image which is most approximate to the appearance of the subject that the user actually sees. For example, the user may select one of the filter effects provided by the electronic device depending on his/her preference, and the electronic device may provide hardware setting values corresponding to the selected filter effect to the camera module. The electronic device may generate and display an image, to which the selected filter effect is applied. In this case, the user should select a filter effect suitable to the atmosphere/environment to be applied to the image, so the user may need to learn a variety of filter effects.

The post-processing method may obtain the desired filter effect through an image post-processing process for the image. The image post-processing method may give special effects by applying a modification to the color, brightness, shape, size and aesthetic element of the image for the original image. The image post-processing method may include a pixel-based processing method for processing specific pixels of image data one by one, and an area-based processing method that uses a relationship between a pixel and its adjacent pixel, and may also include a processing method advanced through a combination thereof. Various types of filter effects that can be used in the post-processing method may be provided in the form of a filter effect library, and the electronic device may apply the filter effect selected by the user to the stored image, the captured image, or the preview image, and may display the filter effect-applied image.

The electronic device may provide a preview for each filter effect in order to help the user select a filter effect while the original image is displayed. For example, the electronic device may generate thumbnail images to which respective filter effects are applied, and display the thumbnail images on the screen, thereby providing a preview for the filter effects.

FIG. 1 is a diagram illustrating a conventional screen which provides a filter effect list using thumbnail images. Referring to FIG. 1, if a filter effect list is requested while an original image 10, to which filter effects are to be applied, is displayed, preview thumbnail images 20 of the original image 10, to which different filter effects are applied, are generated as many as the number of filter effects to be displayed on the screen, and overlaid on the original image 10. Accordingly, the user may check a preview corresponding to each filter effect through the preview thumbnail images 20.

However, in the case of the existing or conventional filter effect previews, since the preview thumbnail images 20 are thumbnail images for the original image 10, they may have a low image quality and a small size. Thus, the user may know the atmosphere for the filter effect, but the resulting image, to which the filter effect is actually applied, may be different from the user expectations. Therefore, there is a need for a preview electronic device in which the result to which the filter effect is applied can be expected more accurately.

Further, with a conventional filter effect preview, it is inconvenient that multiple filter effects cannot be applied in a single process. Thus, the user typically has to shoot the subject while replacing filter effects, or apply multiple filter effects. Further, with conventional filter effect previews, the user may not be able to apply multiple filter effects to one image at the same time.

In addition, when the user desires to purchase a new filter effect, it is not possible to provide an accurate preview for the new filter effect.

SUMMARY

An aspect of the present disclosure provides a method and apparatus capable of more accurately providing a preview of a filter effect for an image.

Another aspect of the present disclosure provides a method and apparatus capable of utilizing multiple filter effects to fit a user's intention.

Another aspect of the present disclosure provides a method and apparatus capable of providing a preview for a new filter effect prior to purchase.

In accordance with an aspect of the present disclosure, there is provided a method for displaying an image in an electronic device. The method includes displaying an image, and if a filter effect list request is input, dividing at least a portion of the image into a plurality of filter areas, and displaying a preview image in which different filter effects are applied to the plurality of filter areas.

In accordance with another aspect of the present disclosure, there is provided an electronic device including a display and a processor configured to display an image on the display, and if a filter effect list request is input, divide at least a portion of the image into a plurality of filter areas; and display a preview image in which different filter effects are applied to the plurality of filter areas.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, like reference numerals will be understood to refer to like parts, components, and structures.

DETAILED DESCRIPTION

Figure 1:
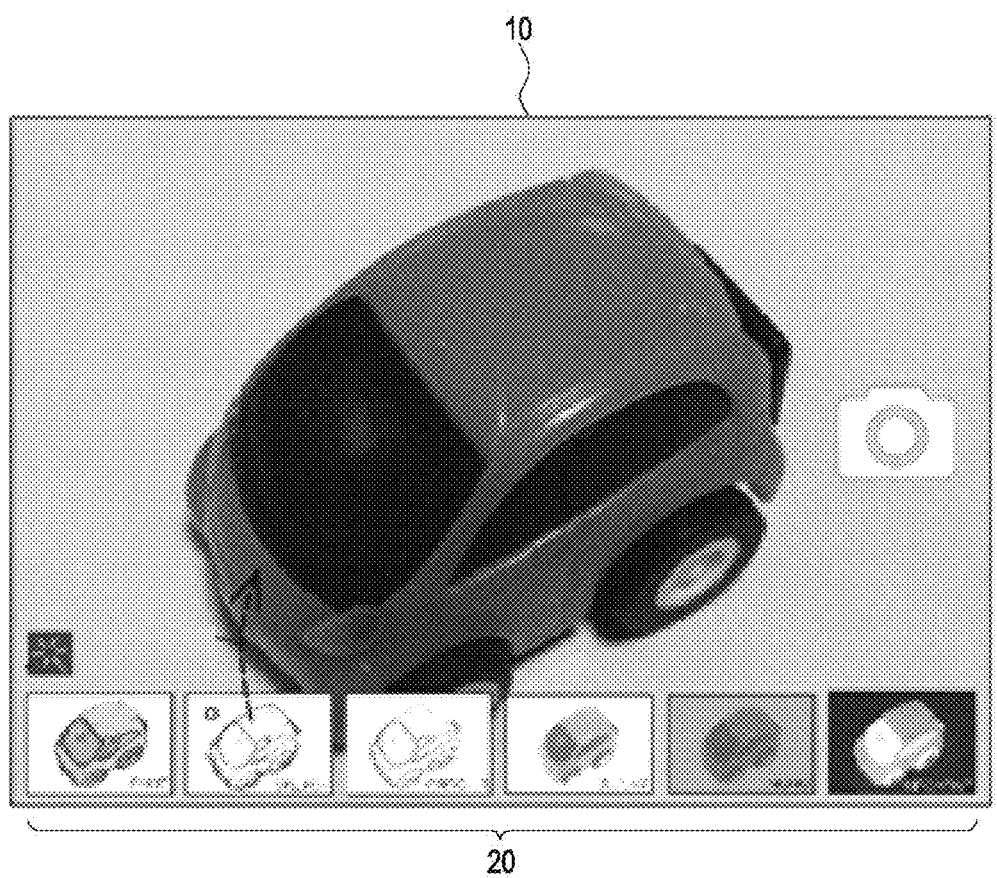
FIG. 1 is a diagram illustrating a conventional screen which provides a filter effect list using thumbnail images.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

An electronic device according to various embodiments of the present disclosure may include, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. the wearable device may include at least one of an accessory-type wearable device (e.g., a watch, a ring, a bracelet, an anklet, a necklace, smart glasses, a contact lens, or a head mounted device (HMD)), a fabric/clothing-integrated wearable device (e.g., electronic clothing), a body-mounted wearable device (e.g., a skin pad or an electronic tattoo), or a bio-implantable wearable device (e.g., a implantable circuit).

The electronic device may be a smart home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics devices, security devices, an automotive head unit, a robot for home or industry, an automatic teller machine (ATM), point of sales (POS) devices, or an Internet of Things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may be a flexible device. Further, the electronic device is not limited to the aforementioned devices, and may include a new electronic device according to the development of new technologies.

Hereinafter, an electronic device will be described with reference to the accompanying drawings. As used herein, the term "user" may indicate a person who uses an electronic device or a device (e.g., an artificial intelligence electronic device) that uses an electronic device.

Figure 2:
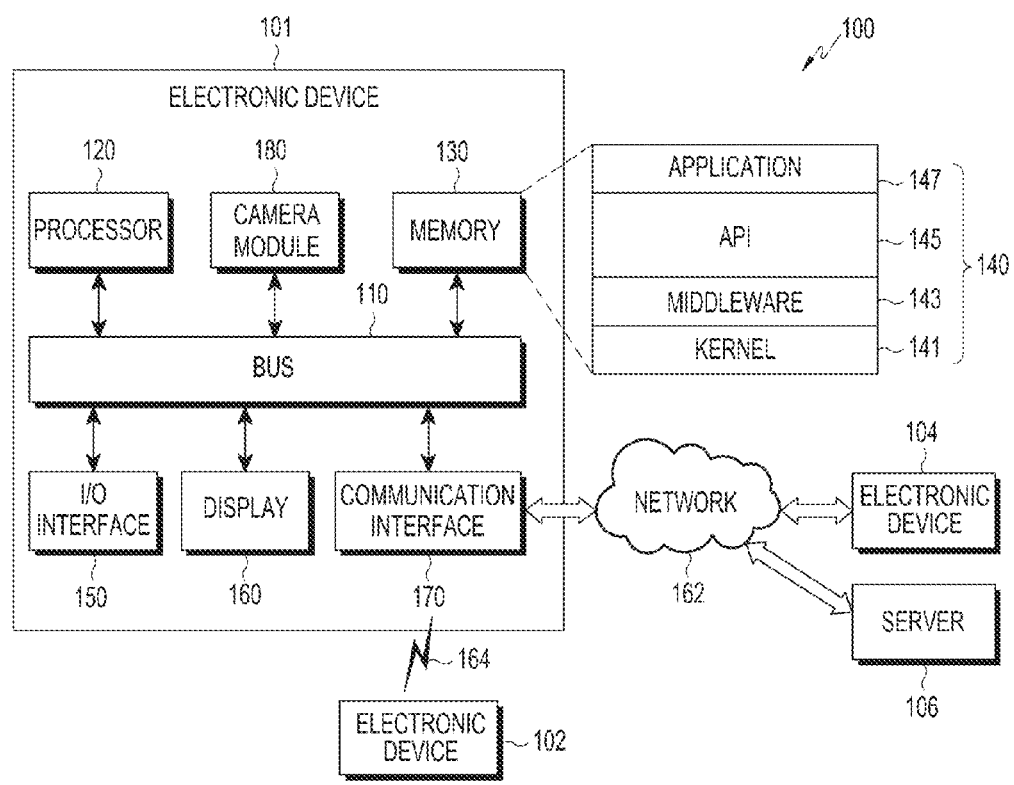
FIG. 2 is a diagram illustrating a network environment including an electronic device, according to an embodiment of the present disclosure.

FIG. 2 is a diagram illustrating a network environment including an electronic device, according to an embodiment of the present disclosure.

Referring to FIG. 2, an electronic device 101 in a network environment 100 is disclosed. The electronic device 101 may include a bus 110, a processor 120, a memory 130, an input/output (I/O) interface 150, a display 160, a communication unit 170 and a camera module 180. In some embodiments, the electronic device 101 may omit at least one of the components, or may additionally include other embodiments.

The bus 110 may include, for example, a circuit that connects the components 110 to 180 to each other, and transfers the communication (e.g., a control message and/or data) between the components 110 to 180.

The processor 120 may include one or more of a central processing unit (CPU), an application processor (AP) or a communication processor (CP). The processor 120 may, for example, execute a control and/or communication-related operation or data processing for at least one other component of the electronic device 101.

The memory 130 may include a volatile and/or non-volatile memory. The memory 130 may, for example, store a command or data related to at least one other component of the electronic device 101. The memory 130 may store software and/or a program 140. The program 140 may include, for example, a kernel 141, a middleware 143, an application programming interface (API) 145, and/or an application program(s) (or 'application') 147. At least some of the kernel 141, the middleware 143 or the API 145 may be referred to as an operating system (OS).

The kernel 141 may, for example, control or manage the system resources (e.g., the bus 110, the processor 120, the memory 130 or the like) that are used to execute the operation or function implemented in other programs (e.g., the middleware 143, the API 145, the application program 147 or the like). Further, the kernel 141 may provide an interface by which the middleware 143, the API 145 or the application program 147 can control or manage the system resources by accessing the individual components of the electronic device 101.

The middleware 143 may, for example, perform an intermediary role so that the API 145 or the application program 147 may exchange data with the kernel 141 by communicating with the kernel 141. Further, the middleware 143 may process one or more work requests received from the application program 147 according to their priority. For example, the middleware 143 may give a priority to use the system resources (e.g., the bus 110, the processor 120, the memory 130 or the like) of the electronic device 101, to at least one of the application programs 147. For example, the middleware 143 may process the one or more work requests according to the priority given to at least one of the application programs 147, thereby performing scheduling or load balancing for the one or more work requests.

The API 145 is, for example, an interface by which the application program 147 controls the function provided in the kernel 141 or the middleware 143, and may include, for example, at least one interface or function (e.g., an instruction) for file control, window control, image processing or character control.

The I/O interface 150 may, for example, serve as an interface that can transfer a command or data received from the user or other external devices to the other components of the electronic device 101. Further, the I/O interface 150 may output a command or data received from the other components of the electronic device 101, to the user or other external devices.

The display 160 may include, for example, a liquid crystal display (LCD) display, a light emitting diode (LED) display, an organic light emitting diode (OLED) display, a microelectromechanical systems (MEMS) display, or an electronic paper display. The display 160 may, for example, display a variety of content (e.g., texts, images, videos, icons, symbols or the like), for the user. The display 160 may include a touch screen, and may receive a touch input, a gesture input, a proximity input or a hovering input made by, for example, an electronic pen or a part of the user's body.

The communication interface 170 may, for example, establish communication between the electronic device 101 and a first external electronic device 102, a second external electronic device 104 or a server 106. For example, the communication interface 170 may communicate with the second external electronic device 104 or the server 106 by being connected to a network 162 through wireless communication or wired communication.

The wireless communication may include at least one of, for example, long term evolution (LTE), long term evolution-advanced (LTE-A), code division multiple access (CDMA), wideband code division multiple access (WCDMA), universal mobile telecommunications system (UMTS), wireless broadband (WiBro) or global system for mobile communications (GSM), as a cellular communication protocol. Further, the wireless communication may include, for example, short-range communication 164. The short-range communication 164 may include at least one of, for example, wireless fidelity (WiFi), Bluetooth, near field communication (NFC) or global navigation satellite system (GNSS). GNSS may include at least one of, for example, global positioning system (GPS), global navigation satellite system (Glonass), navigation satellite system (Beidou) or Galileo, the European global satellite-based navigation system, depending on the use area or the bandwidth. Herein, "GPS" may be interchangeably used with "GNSS". The wired communication may include at least one of, for example, universal serial bus (USB), high definition multimedia interface (HDMI), recommended standard 232 (RS-232) or plain old telephone service (POTS). The network 162 may include a telecommunications network, for example, at least one of the computer network (e.g., a local area network (LAN) or a wide area network (WAN)), the Internet, or the telephone network.

The camera module 180 is, for example, a device that can shoot (or capture) still images and videos. In one embodiment, the camera module 180 may include at least one image sensor (e.g., a front image sensor or a rear image sensor), a lens, an image signal processor (ISP) or a flash (e.g., an LED or xenon lamp).

Each of the first and second external electronic devices 102 and 104 may be identical or non-identical in type to the electronic device 101. The server 106 may include a group of one or more servers. All or some of the operations executed in the electronic device 101 may be executed in one or multiple other electronic devices (e.g., the electronic devices 102 and 104 or the server 106). In a case where the electronic device 101 should perform a certain function or service automatically or upon request, the electronic device 101 may send a request for at least some of the functions related thereto to the electronic devices 102 and 104 or the server 106, instead of or in addition to spontaneously executing the function or service. The electronic devices 102 and 104 or the server 106 may execute the requested function or additional function, and transfer the results to the electronic device 101. The electronic device 101 may process the received results intact or additionally, to provide the requested function or service. To this end, for example, the cloud computing, distributed computing, or client-server computing technology may be used.

The server 106 may be a market system server device configured to allow the user to purchase a downloadable filter. The electronic device 101 may access the server 106 by the request from the user of the electronic device 101 or the request from the application installed in the electronic device 101. The electronic device 101 may select a filter effect in the market, or a filter effect may be recommended by the market. The selected filter effect may be downloaded and stored in the electronic device 101.

Figure 3:
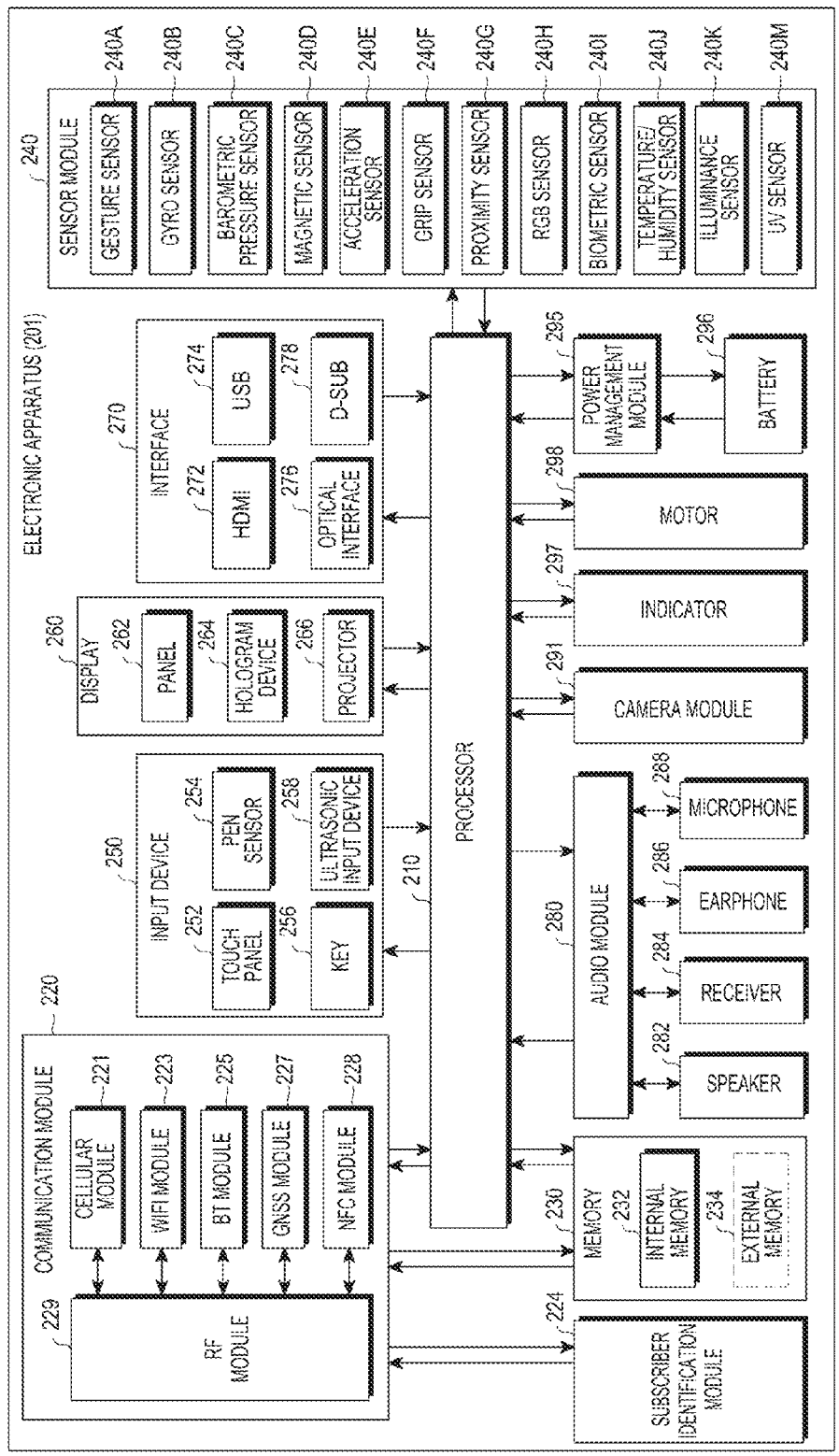
FIG. 3 is a diagram illustrating an electronic device, according to an embodiment of the present disclosure.

FIG. 3 is a diagram illustrating an electronic device 201 according, to an embodiment of the present disclosure. The electronic device 201 may include, for example, the entirety or a part of the electronic device 101 shown in FIG. 2. The electronic device 201 may include at least one processor (e.g., application processor (AP)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297 and a motor 298.

The processor 210 may, for example, control a plurality of hardware or software components connected to the processor 210 by running the operating system or application program, and may process and compute a variety of data. The processor 210 may include the structure that is identical or similar to that of the processor 120 in FIG. 2. The processor 210 may, for example, be implemented as a system on chip (SoC). In one embodiment, the processor 210 may further include a graphic processing unit (GPU) and/or an image signal processor. The processor 210 may include at least some (e.g., a cellular module 221) of the components shown in FIG. 3. The processor 210 may load, on a volatile memory, a command or data received from at least one of other components (e.g., a non-volatile memory) and process the loaded data, and may store a variety of data in a non-volatile memory.

If there is a filter effect list request while an image or video is displayed, the processor 210 may divide at least a partial area (or a portion) of the displayed image or video into a plurality of filter areas, or set each of the plurality of filter areas including the partial area of the displayed image or video. The processor 210 may generate a preview image in which a different filter effect is applied to each of the plurality of filter areas, and display the preview image on the display 260. In other words, the processor 210 may apply the filter effect to the image data corresponding to each filter area in the full image data of the displayed image or video.

If there is an input to select at least one filter effect on the preview image, the processor 210 may generate a resulting image in which the selected filter effect is applied to the entire original image, and display the resulting image on the display 260. A plurality of filter effects can be selected, and the processor 210 may generate a resulting image to which all of the plurality of selected filter effects are applied, or may provide a plurality of resulting images, which correspond to the plurality of selected filter effects.

The processor 210 may adjust the size of the filter area on the displayed preview image in response to a user input, and may provide a sub filter effect of the user-selected filter effect.

Further, the processor 210 may control an operation of the electronic device 201 for downloading a new filter effect from the server 106. On various cases, the processor 210 may download filter effect data of a preview version for the new filter effect and store the filter effect data in the memory 230, and if there is a filter effect list request, the processor 210 may generate a preview image including a filter effect of a preview version (e.g., a preview filter effect), and display the preview image. The preview filter effect may be used during generation of a preview image, but cannot be used during generation of a resulting image. Otherwise, the preview filter effect may be used during generation of a resulting image, but the resulting image cannot be stored in the memory 230. When the preview image including the preview filter effect is provided, or when the original image, to which the preview filter effect has been applied, is provided, it is possible to provide information for guiding purchase or download of the filter effect data of a formal version, which corresponds to the preview filter effect.

The electronic device 201 may provide the preview image in conjunction with a wearable device.

The processor 210 may include a graphic library manager, a filter core, a filter manager and a package manager.

The graphic library manager may serve as a shader for initializing a graphic library (GL) (e.g., openGL) and expressing the image shape. The graphic library manager may express the image shape by configuring a texture which is the graphic representation unit, and configuring the desired shape in which the texture is to be represented.

The filter core is a common module that applies a filter effect to an image, and may manage the basic framework for performing an operation of actually applying the filter effect. The filter core may include an interface for providing a filter effect-related API to external applications.

The filter manager may manage the preloaded or downloaded filter effects, and install a package. The filter manager may transfer information on the filter effects to the filter core upon request. The filter manager may monitor the package manager to determine whether there are downloaded filter effects, and proceed with installation if there are downloaded filter effects.

The package manager may install and manage the file that is downloaded from the server 106 and stored. Generally, the package manager is a manager that is involved in downloading a file from the sever 106 such as the market, and the preview filter effect for the downloaded filter effect or the filter effect data of the formal version may also be downloaded in the same way.

The communication module 220 may be identical or similar in structure to the communication interface 170 in FIG. 2. The communication module 220 may include, for example, the cellular module 221, a WiFi module 223, a BT module 225, a GNSS module 227 (e.g., a GPS module, a Glonass module, a Beidou module or a Galileo module), an NFC module 228, and a radio frequency (RF) module 229.

The cellular module 221 may, for example, provide a voice call service, a video call service, a messaging service or an Internet service over a communication network. The cellular module 221 may perform identification and authentication of the electronic device 201 within the communication network using the SIM card 224. The cellular module 221 may perform some of the functions that can be provided by the processor 210. The cellular module 221 may include a communication processor (CP).

Each of the WiFi module 223, the BT module 225, the GNSS module 227 or the NFC module 228 may include, for example, a processor for processing the data transmitted or received through the corresponding module. At least some (e.g., two or more) of the cellular module 221, WiFi module 223, the BT module 225, the GNSS module 227 or the NFC module 228 may be included in one integrated chip (IC) or IC package.

The RF module 229 may, for example, transmit and receive communication signals (e.g., RF signals). The RF module 229 may include, for example, a transceiver, a power amplifier module (PAM), a frequency filter, a low noise amplifier (LNA), or an antenna. At least one of the cellular module 221, the WiFi module 223, the BT module 225, the GNSS module 227 or the NFC module 228 may transmit and receive RF signals through a separate RF module.

The SIM 224 may include an embedded SIM. The SIM 224 may include unique identification information (e.g., integrated circuit card identifier (ICCID)) or subscriber information (e.g., international mobile subscriber identity (IMSI)).

The memory 230 may include, for example, an internal memory 232 or an external memory 234. The internal memory 232 may include at least one of, for example, a volatile memory (e.g., dynamic read access memory (RAM) (DRAM), static RAM (SRAM), synchronous dynamic RAM (SDRAM) or the like) or a non-volatile memory (e.g., one time programmable read only memory (ROM) (OTPROM), programmable ROM (PROM), erasable and programmable ROM (EPROM), electrically erasable and programmable ROM (EEPROM), mask ROM, flash ROM, flash memory (e.g., a NAND flash, a NOR flash or the like), hard drive, or solid state drive (SSD)).

The external memory 234 may further include a flash drive, for example, compact flash (CF), secure digital (SD), micro secure digital (Micro-SD), mini secure digital (Mini-SD), extreme digital (xD), a multi-media card (MMC), a memory stick or the like. The external memory 234 may be functionally and/or physically connected to the electronic device 201 through various interfaces.

The memory 230 may store a download filter repository and a metadata database.

The download filter repository is a repository that has stored the downloaded filter effects (e.g., library files and filter effect resources). The download filter repository may store filter effect data of the preview version and filter effect data of the formal version. The filter effect data of the preview version may be used during generation of the preview image, but its use may be restricted during shooting or during generation of the resulting image. The filter effect data of the preview version may be used to induce to download the filter effect data of the formal version in conjunction with the filter effect market. The filter effect data of the formal version is a filter effect of the user manual download/purchase version.

The metadata database is an area where the metadata (e.g., information about names and thumbnails) of the information about the filter effects is stored, and the metadata database may be updated when the filter effects are downloaded to install their package. The metadata may be obtained through the filter manager.

The sensor module 240 may, for example, measure the physical quantity or detect the operating status of the electronic device 201, and convert the measured or detected information into an electrical signal. The sensor module 240 may include at least one of, for example, a gesture sensor 240A, a gyro sensor 240B, a barometric pressure sensor 240C, a magnetic sensor 240D, an acceleration sensor 240E, a grip sensor 240F, a proximity sensor 240G, a color sensor (e.g., red-green-blue (RGB) sensor) 240H, a biometric sensor 240I, a temperature/humidity sensor 240J, an illuminance sensor 240K, or a ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling at least one or more sensors belonging thereto. The electronic device 201 may further include a processor configured to control the sensor module 240, independently of or as a part of the processor 210, thereby to control the sensor module 240 while the processor 210 is in a sleep state.

The input device 250 may include, for example, a touch panel 252, a (digital) pen sensor 254, a key 256, or an ultrasonic input device 258. The touch panel 252 may, for example, use at least one of the capacitive, resistive, infrared or ultrasonic schemes. The touch panel 252 may further include a control circuit. The touch panel 252 may further include a tactile layer, to provide a tactile or haptic feedback to the user.

The (digital) pen sensor 254, for example, may be a part of the touch panel 252, or may include a separate recognition sheet. The key 256 may include, for example, a physical button, an optical key or a keypad. The ultrasonic input device 258 may detect ultrasonic waves generated in an input tool using a microphone 288, to identify the data corresponding to the detected ultrasonic waves.

The display 260 may include a panel 262, a hologram device 264, or a projector 266. The panel 262 may be identical or similar in structure to the display 160 in FIG. 2. The panel 262 may, for example, be implemented to be flexible, transparent or wearable. The panel 262, together with the touch panel 252, may be implemented as one module. The hologram device 264 may show stereoscopic images in the air using the interference of the light. The projector 266 may display images by projecting the light on the screen. The screen may, for example, be disposed on the inside or outside of the electronic device 201. In one embodiment, the display 260 may further include a control circuit for controlling the panel 262, the hologram device 264, or the projector 266.

The interface 270 may include, for example, an HDMI 272, a USB 274, an optical interface 276 or a D-subminiature (D-sub) 278. The interface 270 may, for example, be included in the communication interface 170 shown in FIG. 2. Additionally or alternatively, the interface 270 may include, for example, a mobile high-definition link (MHL) interface, a secure digital (SD) card/multi-media card (MMC) interface or an infrared data association (IrDA) interface.

The audio module 280 may, for example, convert the sounds and the electrical signals bi-directionally. At least some components of the audio module 280 may, for example, be included in the I/O interface 150 shown in FIG. 2. The audio module 280 may, for example, process the sound information that is received or output through a speaker 282, a receiver 284, an earphone 286 or the microphone 288.

The camera module 291 is, for example, a device capable of capturing still images and videos. The camera module 291 may include one or more image sensors (e.g., a front image sensor or a rear image sensor), a lens, an image signal processor (ISP), or a flash (e.g., an LED or xenon lamp).

The power management module 295 may, for example, manage the power of the electronic device 201. The power management module 295 may include, for example, a power management integrated circuit (PMIC), a charger integrated circuit (IC), or a battery gauge. The PMIC may have the wired and/or wireless charging schemes. The wireless charging scheme may include, for example, a magnetic resonance scheme, a magnetic induction scheme, or an electromagnetic scheme, and the power management module 295 may further include additional circuits (e.g., a coil loop, a resonant circuit, a rectifier or the like) for wireless charging. The battery gauge may, for example, measure the remaining capacity, charging voltage, charging current or temperature of the battery 296. The battery 296 may include, for example, a rechargeable battery and/or a solar battery.

The indicator 297 may indicate specific status (e.g., boot status, message status, charging status or the like) of the electronic device 201 or a part (e.g. the processor 210) thereof. The motor 298 may convert an electrical signal into mechanical vibrations to generate a vibration or haptic effect. Although not shown, the electronic device 201 may include a processing device (e.g., GPU) for mobile TV support. The processing device for mobile TV support may, for example, process the media data that is based on the standards such as digital multimedia broadcasting (DMB), digital video broadcasting (DVB) or mediaFLO™.

Each of the components described herein may be configured with one or more components, names of which may vary depending on the type of the electronic device. The electronic device may include at least one of the components described herein, some of which may be omitted, or may further include additional other components. Further, some of the components of the electronic device may be configured as one entity by being combined, thereby performing the functions of the components before being combined, in the same manner.

Figure 4:
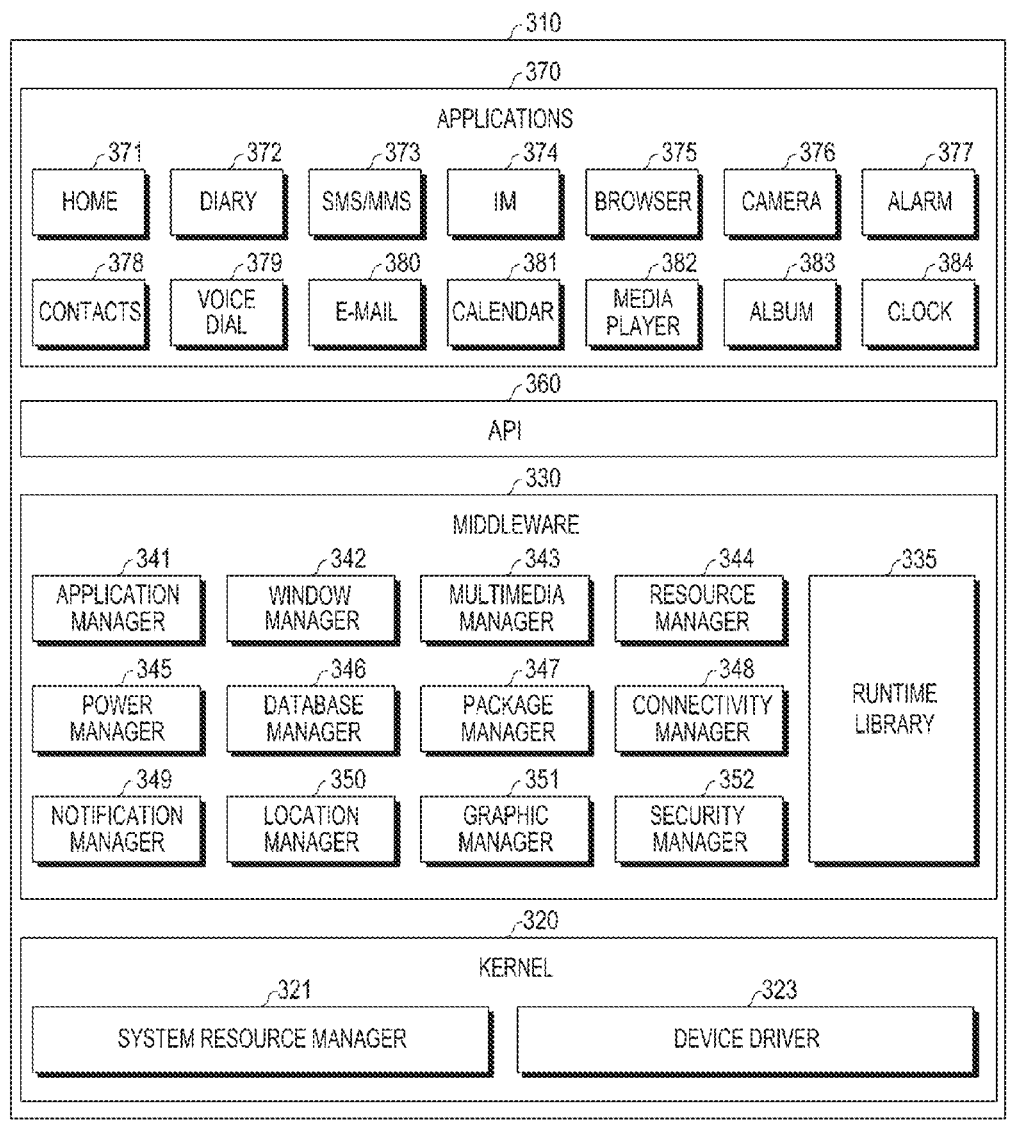
FIG. 4 is a diagram illustrating a program module, according to an embodiment of the present disclosure.

FIG. 4 is a diagram illustrating a program module, according to an embodiment of the present disclosure. A program module 310 may include an operating system (OS) for controlling the resources related to the electronic device 101, and/or a variety of the application programs 147 that run on the operating system. The operating system may be, for example, Android™, iOS™, Windows™, Symbian™, Tizen™, Bada™ or the like.

The program module 310 may include a kernel 320, a middleware 330, an application programming interface (API) 360, and/or an application(s) 370. At least a part of the program module 310 may be preloaded on the electronic device, or downloaded from the external electronic device (e.g., the electronic devices 102 and 104 and the server 106).

The kernel 320 may include, for example, a system resource manager 321 and/or a device driver 323. The system resource manager 321 may control, allocate or recover the system resources. The system resource manager 321 may include a process manager, a memory manager, a file system manager or the like. The device driver 323 may include, for example, a display driver, a camera driver, a Bluetooth driver, a shared memory driver, a USB driver, a keypad driver, a WiFi driver, an audio driver, or an interprocess communication (IPC) driver.

The middleware 330, for example, may provide a function that is required in common by the application(s) 370, or may provide various functions to the application 370 through the API 360 so that the application 370 may efficiently use the limited system resources within the electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a compiler uses to add a new function through a programming language while the application 370 is run. The runtime library 335 may perform an I/O management function, a memory management function, an arithmetic function or the like.

The application manager 341 may, for example, manage the life cycle of at least one of the application(s) 370. The window manager 342 may manage the graphic user interface (GUI) resources that are used on the screen. The multimedia manager 343 may determine the format required for playback of various media files, and encode or decode the media files using a codec for the format. The resource manager 344 may manage resources such as a source code, a memory or a storage space for any one of the application(s) 370.

The power manager 345, for example, may manage the battery or power by operating with the basic input/output system (BIOS), and provide power information required for an operation of the electronic device. The database manager 346 may create, search or update the database that is to be used by at least one of the application(s) 370. The package manager 347 may manage installation or update of applications that are distributed in the form of a package file.

The connectivity manager 348 may, for example, manage wireless connection such as WiFi or Bluetooth. The notification manager 349 may indicate or notify events such as message arrival, appointments and proximity in a manner that doesn't interfere with the user. The location manager 350 may manage the location information of the electronic device. The graphic manager 351 may manage the graphic effect to be provided to the user, or the user interface related thereto. The security manager 352 may provide various security functions required for the system security or user authentication. In one embodiment, if the electronic device 101 includes a phone function, the middleware 330 may further include a telephony manager for managing the voice or video call function of the electronic device.

The middleware 330 may include a middleware module that forms a combination of various functions of the above-described components. The middleware 330 may provide a module specialized for the type of the operating system in order to provide a differentiated function. Further, the middleware 330 may dynamically remove some of the existing components, or add new components.

The API 360 (e.g., the API 145), for example, is a set of API programming functions, and may be provided in a different configuration depending on the operating system. For example, for Android™ or iOS™, the API 360 may provide one API set per platform, and for Tizen™, the API 360 may provide two or more API sets per platform.

The application 370 may include, for example, one or more applications capable of performing functions such as a home 371, a dialer 372, a short message service/multimedia messaging service (SMS/MMS) 373, an instant message (IM) 374, a browser 375, a camera 376, an alarm 377, a contact 378, a voice dial 379, an Email 380, a calendar 381, a media player 382, an album 383, a clock 384, healthcare (e.g., for measuring the quantity of exercise, the blood glucose or the like), or environmental information provision (e.g., for providing information about the atmospheric pressure, the humidity, the temperature or the like).

The application 370 may include an information exchange application for supporting information exchange between the electronic device 101 and the electronic devices 102 and 104. The information exchange application may include, for example, a notification relay application for delivering specific information to the external electronic devices, or a device management application for managing the external electronic devices.

For example, the notification relay application may include a function of delivering notification information generated in other applications (e.g., an SMS/MMS application, an Email application, a healthcare application, an environmental information application or the like) of the electronic device, to the external electronic devices (e.g., the electronic devices 102 and 104). Further, the notification relay application may, for example, receive notification information from an external electronic device, and provide the received notification information to the user.

The device management application may, for example, manage at least one function (e.g., a function of adjusting the turn-on/off of the external electronic device itself (or some components thereof) or the brightness (or the resolution) of the display) of the electronic devices 102 and 104 communicating with the electronic device, and may manage (e.g., install, delete or update) an application operating in the external electronic device or a service (e.g., a call service or a messaging service) provided in the external electronic device.

The application 370 may include an application (e.g., a healthcare application for a mobile medical device) that is specified depending on the properties (indicating that the type of the electronic device is the mobile medical device) of the electronic devices 102 and 104. The application 370 may include an application received or downloaded from the server 106 or the electronic devices 102 and 104. The application 370 may include a preloaded application or a third party application that can be downloaded from the server. The names of the components of the illustrated program module 310 may vary depending on the type of the operating system.

At least a part of the program module 310 may be implemented by software, firmware, hardware or a combination thereof. At least a part of the program module 310 may, for example, be implemented (e.g., executed) by the processor 210. At least a part of the program module 310 may include, for example, a module, a program, a routine, an instruction set or a process, for performing one or more functions.

An electronic device may include a display; and a processor configured to display an image on the display; if a filter effect list request is input, divide at least a partial area of the image into a plurality of filter areas; and display a preview image in which different filter effects are applied to the plurality of filter areas.

If a select and apply request (or a 'Select & Apply' request) for at least one of the plurality of filter areas is received, the processor may apply a filter effect corresponding to the at least one filter area to the entire image and display a resulting image.

The processor may set a filter effect list layer on the image, divide the filter effect list layer into a plurality of filter areas, extract image data corresponding to each of the plurality of filter areas from the image, apply the different filter effect to each of the extracted image data to convert the image data, and generate and display a preview image by combining the converted image data.

The processor may generate a filtered image corresponding to each of a plurality of filter effects by applying each of a plurality of different filter effects to the image, set a filter effect list layer on the image, divide the filter effect list layer into a plurality of filter areas, extract image data corresponding to each of the plurality of filter areas from a different filtered image, and generate and display a preview image by combining the extracted image data.

If a select and apply request for at least one of the plurality of filter areas is received, the processor may determine whether a filter effect corresponding to the at least one filter area is a filter effect of a preview version; if the filter effect corresponding to the at least one filter area is the filter effect of the preview version, the processor may provide 'Not-Applicable' information; and if a purchase request for the filter effect of a preview version is received, the processor may download a filter effect of a formal version for the at least one filter effect.

If a detailed view request (or a 'View More' request) for at least one of the plurality of filter areas is received, the processor may provide a sub filter effect of a filter effect corresponding to the at least one filter area by expanding the at least one filter area.

If at least two of the plurality of filter areas are selected and a shooting request is received, the processor may capture an image and then, apply each filter effect corresponding to each of the selected filter areas to the captured image, to generate a plurality of resulting images.

If at least two of the plurality of filter areas are selected and a shooting request is received, the processor may continuously capture as many images as the number of selected filter areas, and apply a filter effect corresponding to each of the selected filter areas to each of the captured images, to generate a plurality of resulting images.

If at least two of the plurality of filter areas are selected and a video shooting request is received, the processor may generate video to which filter effects corresponding to the selected filter areas are applied.

The preview image may be provided in the electronic device and the resulting image may be provided in a wearable device connected to the electronic device.

Figure 5:
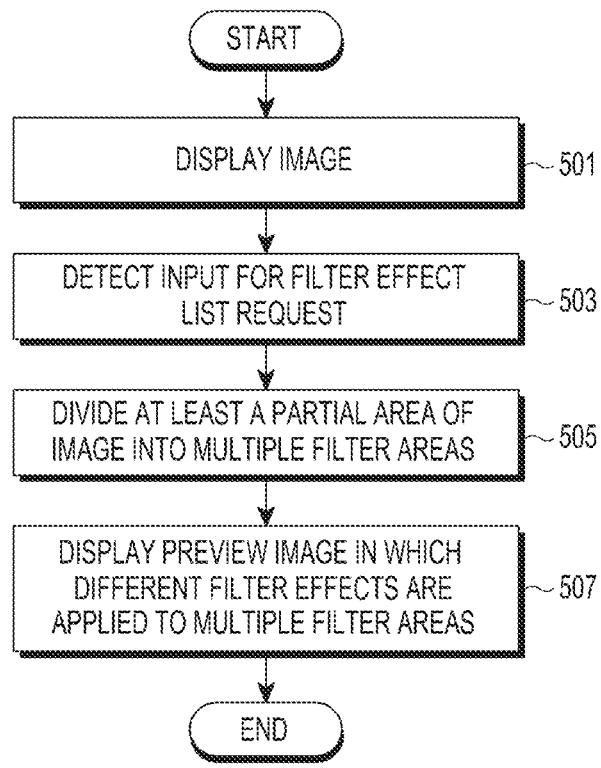
FIGS. 5-7 are flowcharts of a method for a preview image display process for a filter effect, according to an embodiment of the present disclosure.

FIG. 5 is a flowchart of a method for displaying a preview image for providing a filter effect function by an electronic device 201, according to an embodiment of the present disclosure. Referring to FIG. 5, in operation 501, the processor 210 of the electronic device 201 may display an image on the display 260. The user may request a filter effect list through a touch input. Accordingly, the processor 210 of the electronic device 201 may detect an input for a filter effect list request in operation 503. The processor 210 of the electronic device 201 may divide at least a partial area of the displayed image into a plurality of filter areas in operation 505. In other words, the processor 210 of the electronic device 201 may determine the number of filter effects to be provided through one screen, and set (or establish) a plurality of filter areas on the displayed image depending on the determined number of filter effects. In operation 507, the processor 210 of the electronic device 201 may apply a corresponding filter effect to image data corresponding to each of the plurality of filter areas from among the entire image data of the displayed image, and display a preview image in which a different filter effect is applied to each of the plurality of filter areas. In other words, some areas of the image may be converted and displayed depending on the plurality of different filter effects.

Figure 6:
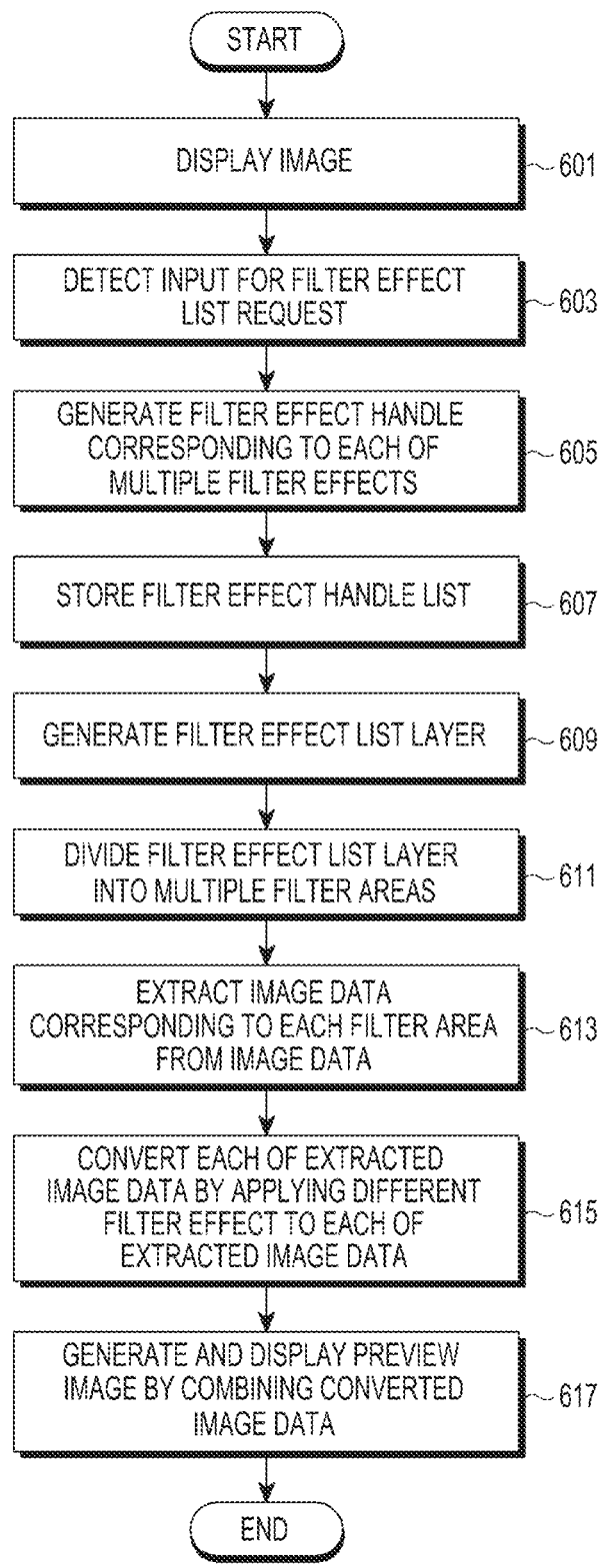
Figure 7:
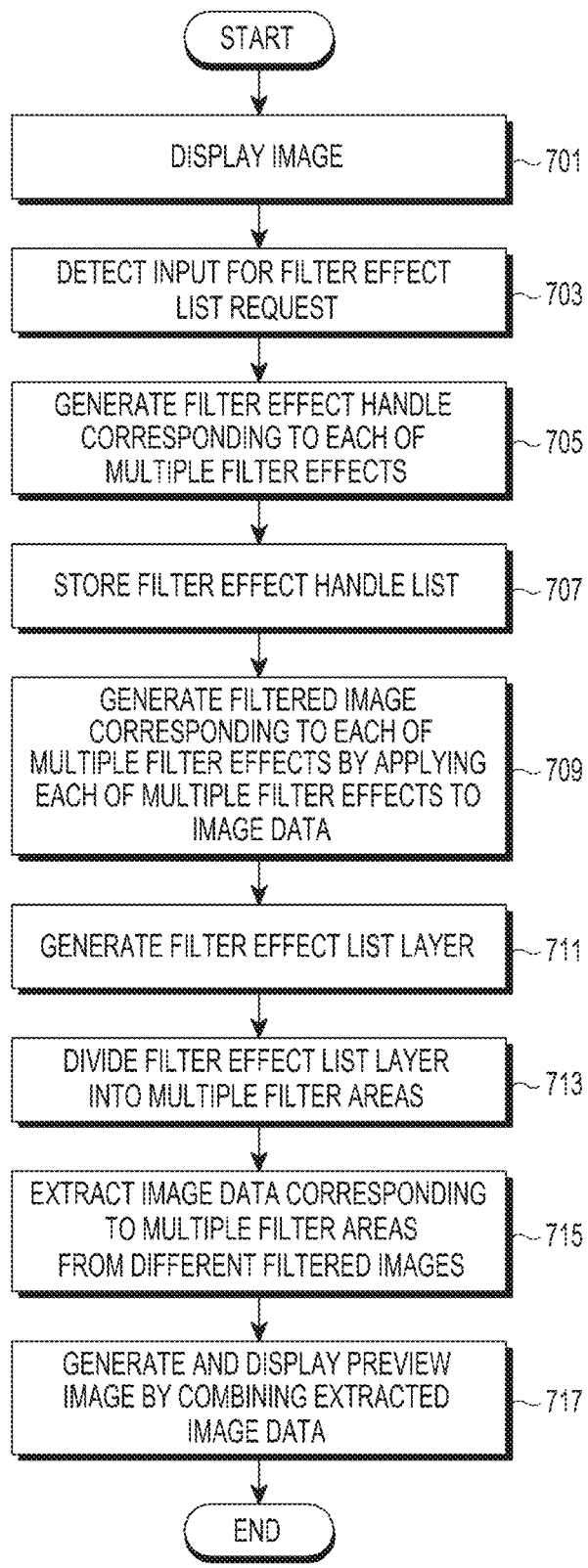

An example of the method for converting some areas of an image depending on the filter effects is shown in FIGS. 6 and 7. FIG. 6 is a flowchart of a method for extracting image data corresponding to each filter area from an image, converting the extracted image data, and generating preview image data by combining the converted image data, according to an embodiment of the present disclosure. FIG. 7 is a flowchart of a method in which the electronic device 201 generates filtered images, to which each of its available multiple filter effects is applied, extracts image data corresponding to each of the plurality of filter areas from the generated filtered images, and combines the extracted image data to generate a preview image, according to an embodiment of the present disclosure.

Referring to FIG. 6, the processor 210 may display an image in operation 601. If there is an input for a filter effect list request in operation 603, the processor 210 may generate, in operation 605, a filter effect handle corresponding to each of all the filter effects that can be provided in the electronic device 201. In operation 607, the processor 210 may store a filter effect handle list. In operation 609, the processor 210 may generate a filter effect list layer. In operation 611, the processor 210 may divide the filter effect list layer into a plurality of filter areas. In operation 613, the processor 210 may extract image data corresponding to each filter area from the image data. In operation 615, the processor 210 may apply a different filter effect to each of the extracted image data to convert each of the extracted image data. In operation 617, the processor 210 may generate and display a preview image by combining the converted image data.

Referring to FIG. 7, the processor 210 may display an image in operation 701. If there is an input for a filter effect list request in operation 703, the processor 210 may generate, in operation 705, a filter effect handle corresponding to each of all the filter effects that can be provided in the electronic device 201. In operation 707, the processor 210 may store a filter effect handle list. In operation 709, the processor 210 may apply each of a plurality of filter effects to image data to generate a filtered image corresponding to each of the plurality of filter effects. In operation 711, the processor 210 may generate a filter effect list layer. In operation 713, the processor 210 may divide the filter effect list layer into a plurality of filter areas. In operation 715, the processor 210 may extract image data corresponding to the plurality of filter areas from different filtered images. In operation 717, the processor 210 may generate and display a preview image by combining the extracted image data.

Figure 8A:
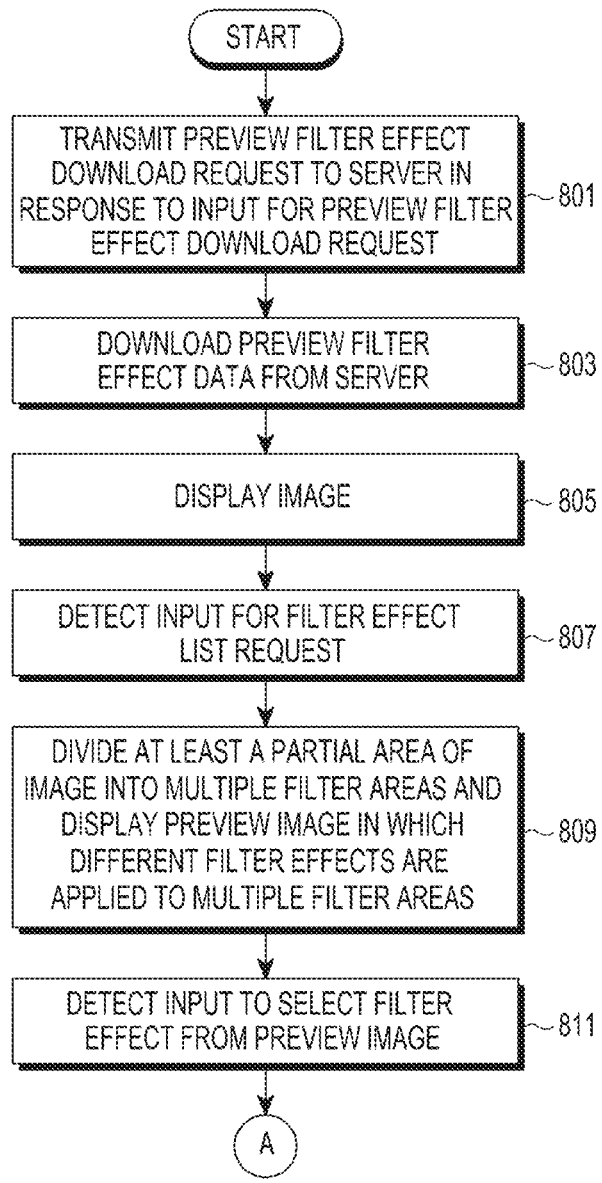
FIGS. 8A-8B are flowcharts of a method for a filter effect purchase process, according to an embodiment of the present disclosure.
Figure 8B:
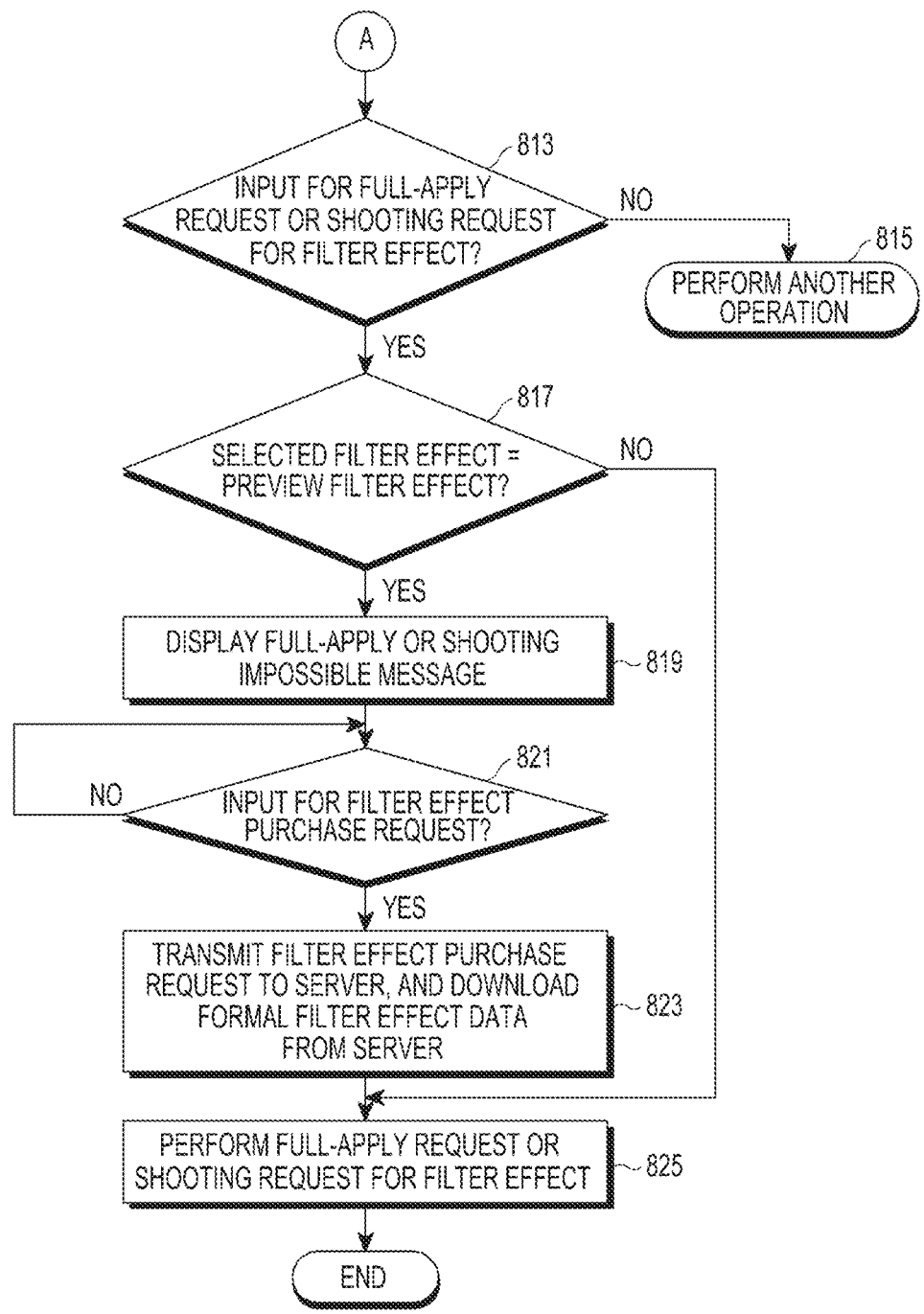

FIGS. 8A and 8B are flowcharts of a method for downloading a filter effect, according to an embodiment of the present disclosure. Referring to FIGS. 8A and 8B, in operation 801, the processor 210 of the electronic device 201 may transmit a preview filter effect download request to the server 106 in response to an input for the preview filter effect download request. The preview filter effect download request may occur in response to a user input, or may automatically occur when an image related application is executed. In operation 803, the processor 210 may download a preview filter effect from the server 106. In operation 805, the processor 210 may display an image. The user may request a filter effect list through a touch input or the like. Accordingly, the processor 210 may detect an input for a filter effect list request in operation 807. In operation 809, the processor 210 may divide at least a partial area of the displayed image into a plurality of filter areas, apply the filter effect to image data corresponding to each of the plurality of filter areas, and display a preview image in which a different filter effect is applied to each of the plurality of filter areas. Upon detecting an input to select a filter effect from a preview image by the user in operation 811, the processor may determine in operation 813 whether there is an input for a full-apply request or shooting request for a selected filter effect. If there is another input other than the input for the full-apply request or shooting request for a filter effect, the processor 210 may perform another operation in operation 815. If there is an input for the full-apply request or shooting request for a filter effect after the selection of a filter effect, the processor 210 may determine in operation 817 whether the selected filter effect is a preview filter effect. If the selected filter effect is not the preview filter effect, the processor 210 may, in operation 825, display a resulting image in which the filter effect is applied to the entire image, or perform shooting to which the filter effect is applied. If the selected filter effect is the preview filter effect, the processor 210 may display the full-apply or shooting impossible message in operation 819. If there is an input for a filter effect purchase request from the user in operation 821, the processor 210 may transmit a filter effect purchase request to the server 106 and receive formal filter effect data from the server 106 in operation 823, thereafter performing operation 825.

A method for displaying an image in an electronic device may include displaying an image; and if a filter effect list request is input, dividing at least a partial area of the image into a plurality of filter areas, and displaying a preview image in which different filter effects are applied to the plurality of filter areas.

The method may further include, if a select and apply request for at least one of the plurality of filter areas is received, applying a filter effect corresponding to the at least one filter area to the entire image and displaying a resulting image.

Dividing at least the portion of the image into the plurality of filter areas may include setting a filter effect list layer on the image; and dividing the filter effect list layer into a plurality of filter areas. Displaying the preview image in which different filter effects are applied to the plurality of filter areas may include extracting image data corresponding to each of the plurality of filter areas from the image; applying the different filter effect to each of the extracted image data to convert the image data; and generating and displaying a preview image by combining the converted image data.

Dividing at least the portion of the image into the plurality of filter areas may include generating a filtered image corresponding to each of a plurality of filter effects by applying each of a plurality of different filter effects to the image; and setting a filter effect list layer on the image; and dividing the filter effect list layer into a plurality of filter areas. Displaying the preview image in which different filter effects are applied to the plurality of filter areas may include extracting image data corresponding to each of the plurality of filter areas from a different filtered image; and generating and displaying a preview image by combining the extracted image data.

The method may further include, if a select and apply request for at least one of the plurality of filter areas is received, determining whether a filter effect corresponding to the at least one filter area is a filter effect of a preview version; if the filter effect corresponding to the at least one filter area is the filter effect of the preview version, providing 'Not-Applicable' information; and if a purchase request for the filter effect of a preview version is received, downloading a filter effect of a formal version for the at least one filter effect.

The method may further include, if a detailed view request for at least one of the plurality of filter areas is received, providing a sub filter effect of a filter effect corresponding to the at least one filter area by expanding the at least one filter area.

The method may further include, if at least two of the plurality of filter areas are selected and a shooting request is received, capturing an image and then, applying each filter effect corresponding to each of the selected filter areas to the captured image, to generate a plurality of resulting images.

The method may further include, if at least two of the plurality of filter areas are selected and a shooting request is received, continuously capturing as many images as the number of selected filter areas, and applying a filter effect corresponding to each of the selected filter areas to each of the captured images, to generate a plurality of resulting images.

The method may further include, if at least two of the plurality of filter areas are selected and a video shooting request is received, generating video to which filter effects corresponding to the selected filter areas are applied.

The preview image may be provided in the electronic device and the resulting image may be provided in a wearable device connected to the electronic device.

Figure 9:
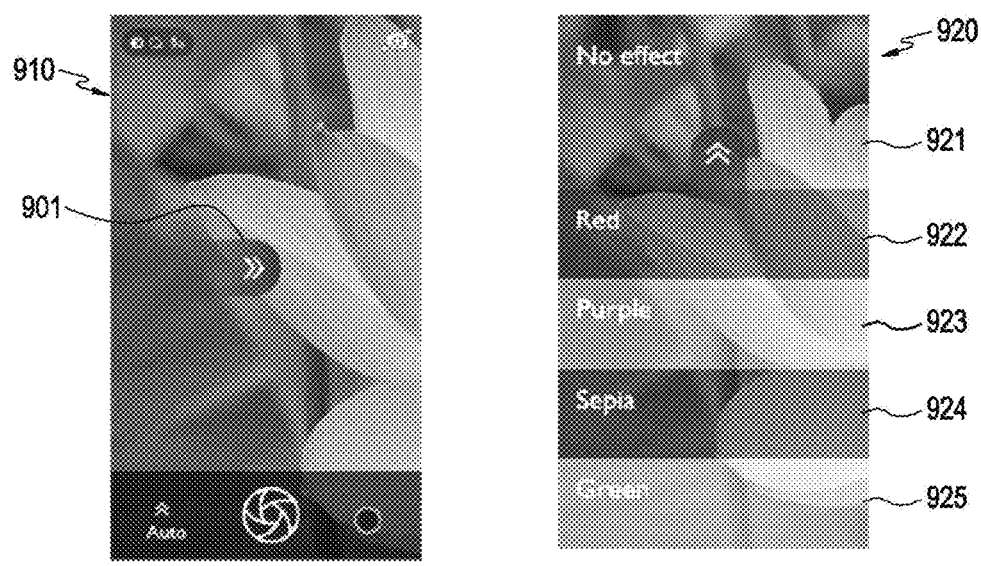
FIGS. 9-22 are diagrams illustrating a filter effect applied a screen, according to an embodiment of the present disclosure.

FIG. 9 is a diagram illustrating a screen displaying a preview image, according to an embodiment of the present disclosure. Referring to FIG. 9, if there is a user's input for a filter effect list request (e.g., a swipe gesture 901) while the electronic device 201 is displaying an image 910, the electronic device 201 may display a preview image 920 including the source area 921 to which no filter effect is applied, and a plurality of filter areas to which different filter effects are applied, for example, a red filter area 922, a purple filter area 923, a sepia filter area 924, and a green filter area 925. In response to the user's scroll up/down gesture, the electronic device 201 may change and display another filter effect list in the filter areas, and immediately apply the selected filter effect among the displayed filter effects to the entire image.

Figure 10:
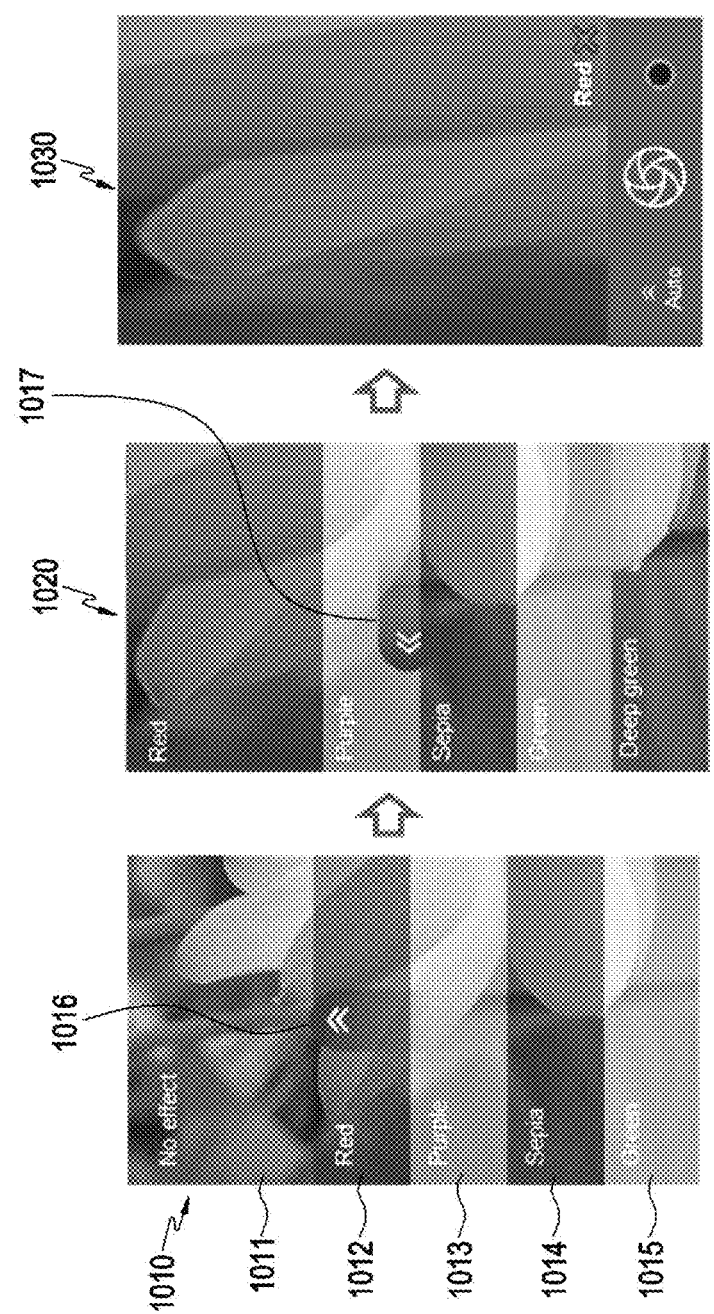

FIG. 10 is a diagram illustrating a detailed view process for a selected filter effect, according to an embodiment of the present disclosure. Referring to FIG. 10, if there is a detailed view input 1016 for a specific filter effect area while a preview image including the source area 1011 to which no filter effect is applied, and a plurality of filter areas to which different filter effects are applied, for example, a red filter area 1012, a purple filter area 1013, a sepia filter area 1014 and a green filter area 1015, is displayed as in a screen 1010, the electronic device 201 may apply a corresponding filter effect to a wider area (e.g., the source area 1011) than the areas where the filter effect list is displayed, thereby making it possible to identify the filter effect in more detail. For example, if a detailed view input occurs in the red filter area 1012, the electronic device 201 may enlarge the red filter area 1012 as in a screen 1020. If a final apply input 1017 occurs, the electronic device 201 may display the resulting image in which the red filter is applied to the entire image, as in a screen 1030. In a case where the user selects view details, it is possible to utilize the voice, blow action, various gestures, icon touch, connected device or the like as a user input to access the filter effect list, select a filter effect and apply the selected filter effect.

The user input for selecting, applying and identifying a filter effect may be implemented through a variety of user gestures.

A filter area of the filter effect list can be enlarged/reduced through pinch zoom.

A filter effect can be applied through 'double tab'.

A filter effect can be applied through 'one tab'.

A filter effect can be applied through 'swipe left'.

The user may select one filter effect from the list of various filter effects and perform shooting using the selected filter effect. The user may perform shooting as soon as applying one filter effect. By providing a gesture or option (e.g., long press, double tab and the like) capable of simultaneously performing an action of selecting and identifying a filter effect and a shooting action, it is possible to make the user to easily perform shooting.

Further, the user may select a plurality of filter effects through a variety of events. It is possible to provide various shooting methods depending on the user selection after selecting a plurality of filter effects (e.g., through multi-touch event, long press and the like). In a case where the user wants to apply multiple filter effects to one image, it is possible to provide a template that can be divided and shot. Further, it is possible to apply a plurality of filter effects to one image in an overlapping manner, or repeatedly apply a different filter effect to one image, thereby to obtain a plurality of images.

Figure 11:
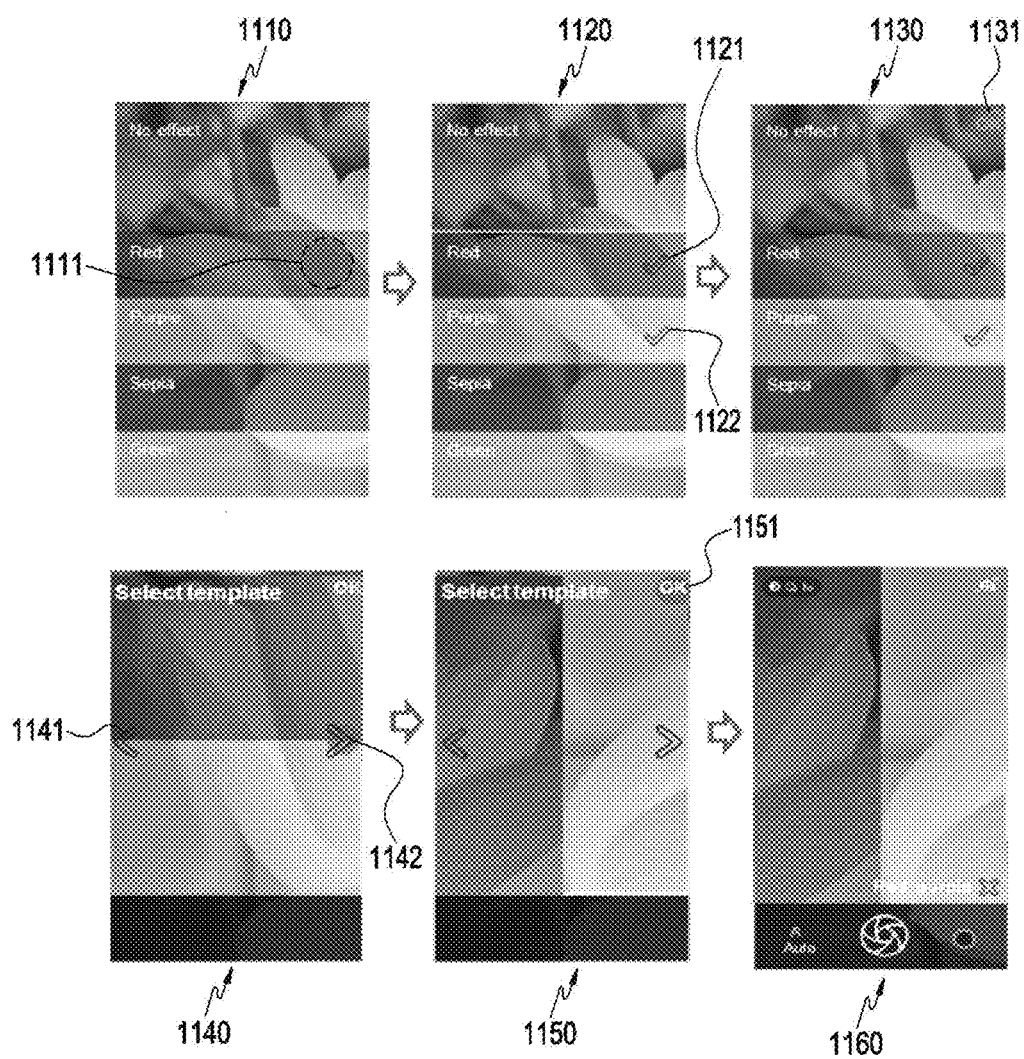

FIG. 11 is a diagram illustrating a process of generating an image to which a filter effect selected during camera shooting is applied depending on the template selection, according to an embodiment of the present disclosure. The template may be recommended depending on the picture content and the aspect ratio. Referring to FIG. 11, if there is a select input 1111 for a red filter while a preview image is being displayed as in a screen 1110, and if there is an additional select input for a purple filter, select symbols 1121 and 1122 may be displayed on the red filter and the purple filter as in a screen 1120. If there is a final select input 1132 as in a screen 1130, a template may be provided as in a screen 1140. If template search buttons 1141 and 1142 are selected on the screen 1140, the user may search and select a variety of templates, and if there is a final select input 1151 after a specific template (e.g., a vertical template) is selected as in a screen 1150, a resulting image may be provided as in a screen 1160.

If the user selects a plurality of filter effects and selects 'no template' during shooting, the electronic device may perform continuous shooting as many times as the number of filter effects, and then apply a respective filter effect to each image or apply a plurality of filter effects to one image, to generate multiple resulting images. Otherwise, the electronic device may generate a resulting image obtained by applying all of a plurality of selected filter effects to one image.

Figure 12:
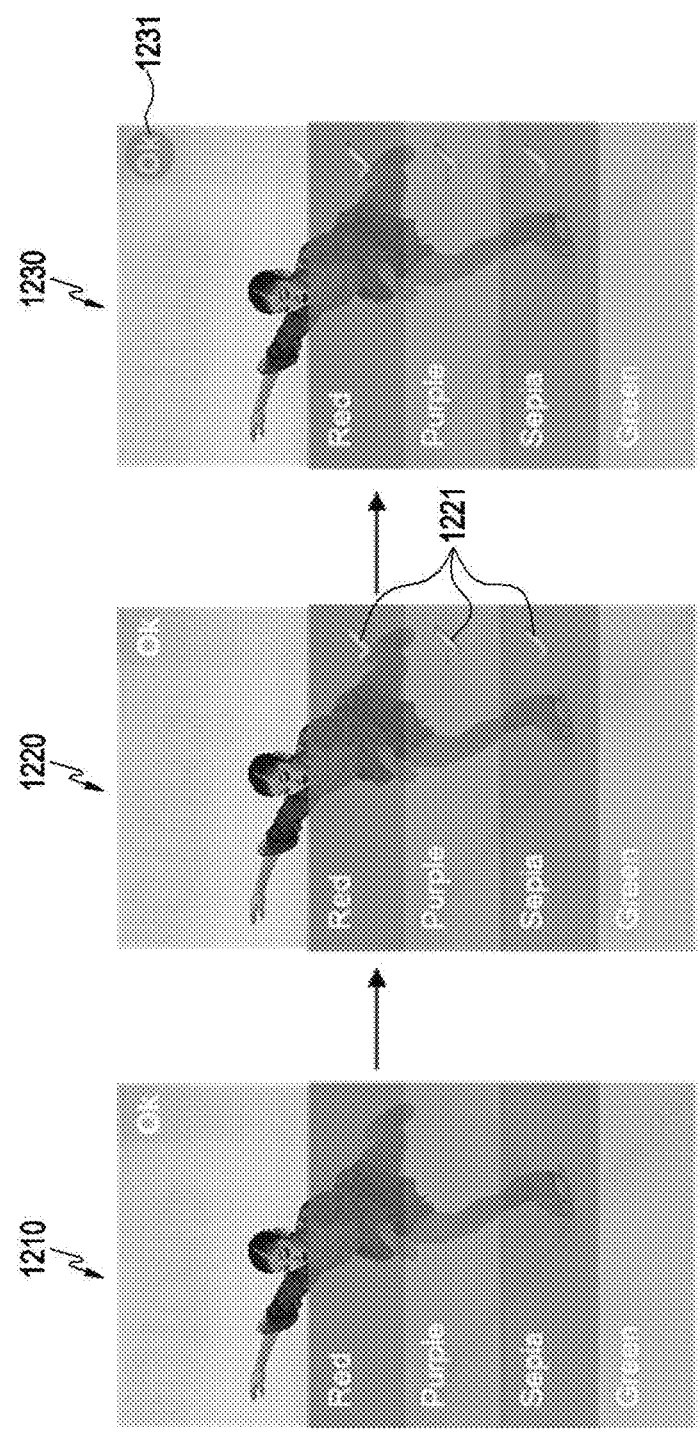
Figure 13:
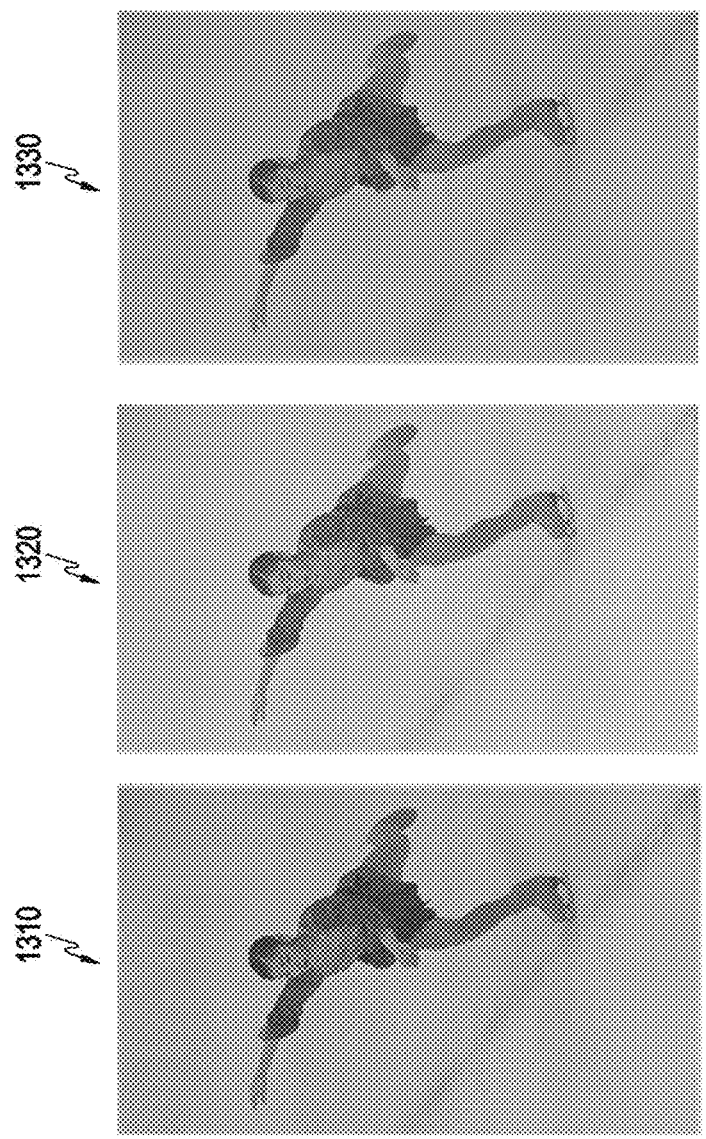
Figure 14:
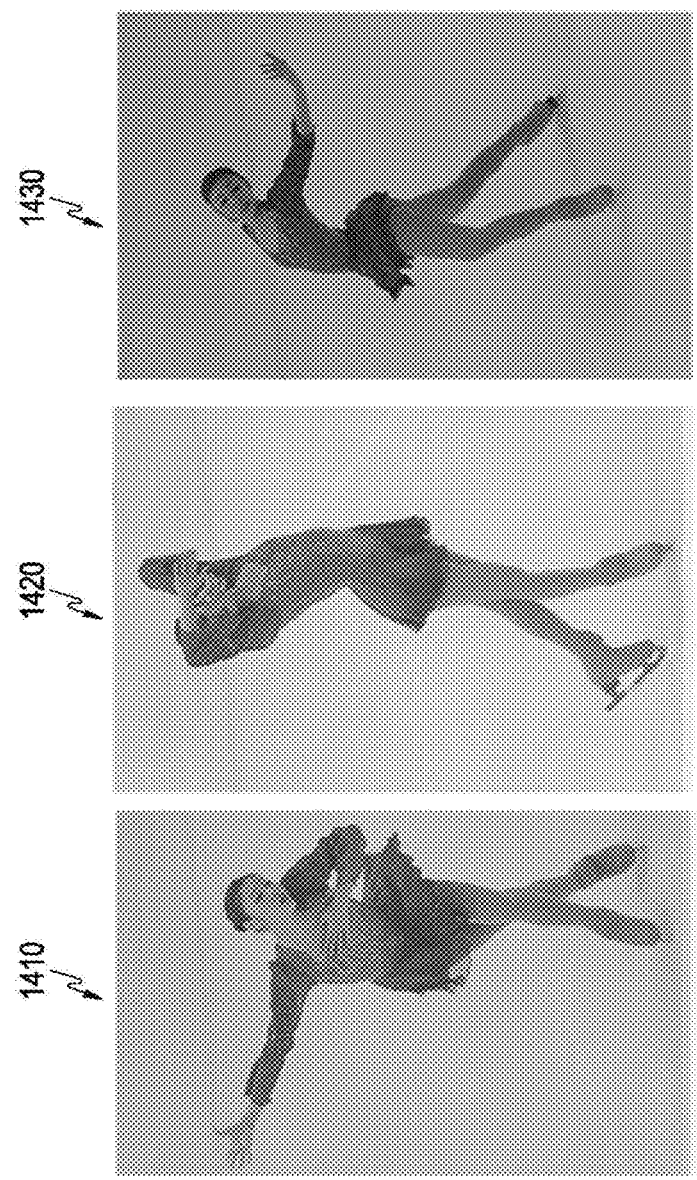

FIG. 12 is a diagram illustrating a process of selecting a plurality of filter effects during shooting, according to an embodiment of the present disclosure. Referring to FIG. 12, if a plurality of filter effects 1221 are selected as in a screen 1220 and then there is a final select input 1231 without template selection as in a screen 1230 while a preview screen including a filter effect list is provided as in a screen 1210, resulting images may be provided as in FIG. 13 or 14. FIG. 13 is a diagram illustrating resulting images 1310, 1320 and 1330 generated by capturing one image and then applying a plurality of selected filter effects to the captured image, according to an embodiment of the present disclosure, and FIG. 14 is a diagram illustrating resulting images 1410, 1420 and 1430 generated by applying a plurality of selected filter effects to respective images that have been continuously captured as many times as the number of filter effects according to an embodiment of the present disclosure.

Since the plurality of selected filter effects can be applied in turn to the continuous shooting, there is no need to set the filter effects one by one for a short time, and the user may check the unexpected photo results without post-correction, enjoying new experiences.

Figure 15:
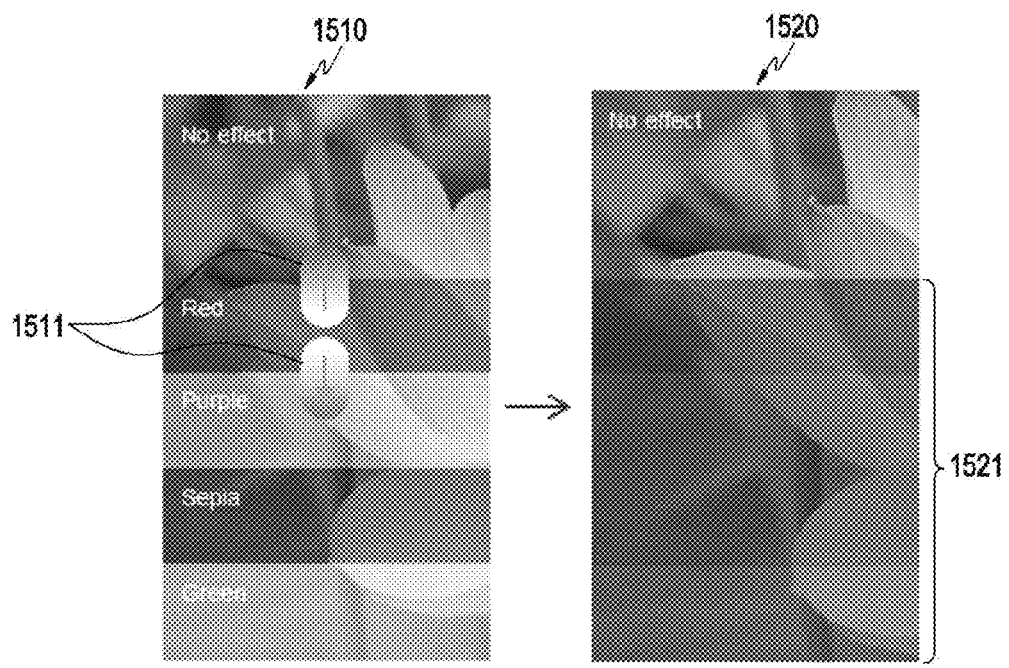

FIG. 15 is a diagram illustrating a process of providing a sub filter effect for a selected filter effect, according to an embodiment of the present disclosure. Referring to FIG. 15, if there is an input 1511 to expand a red filter through 'Pinch Zoom in' as in a screen 1510, a sub filter effect 1521 of the red filter may be processed as in a screen 1520, making it possible for the users to select a little bit more variety of colors.

Figure 16:
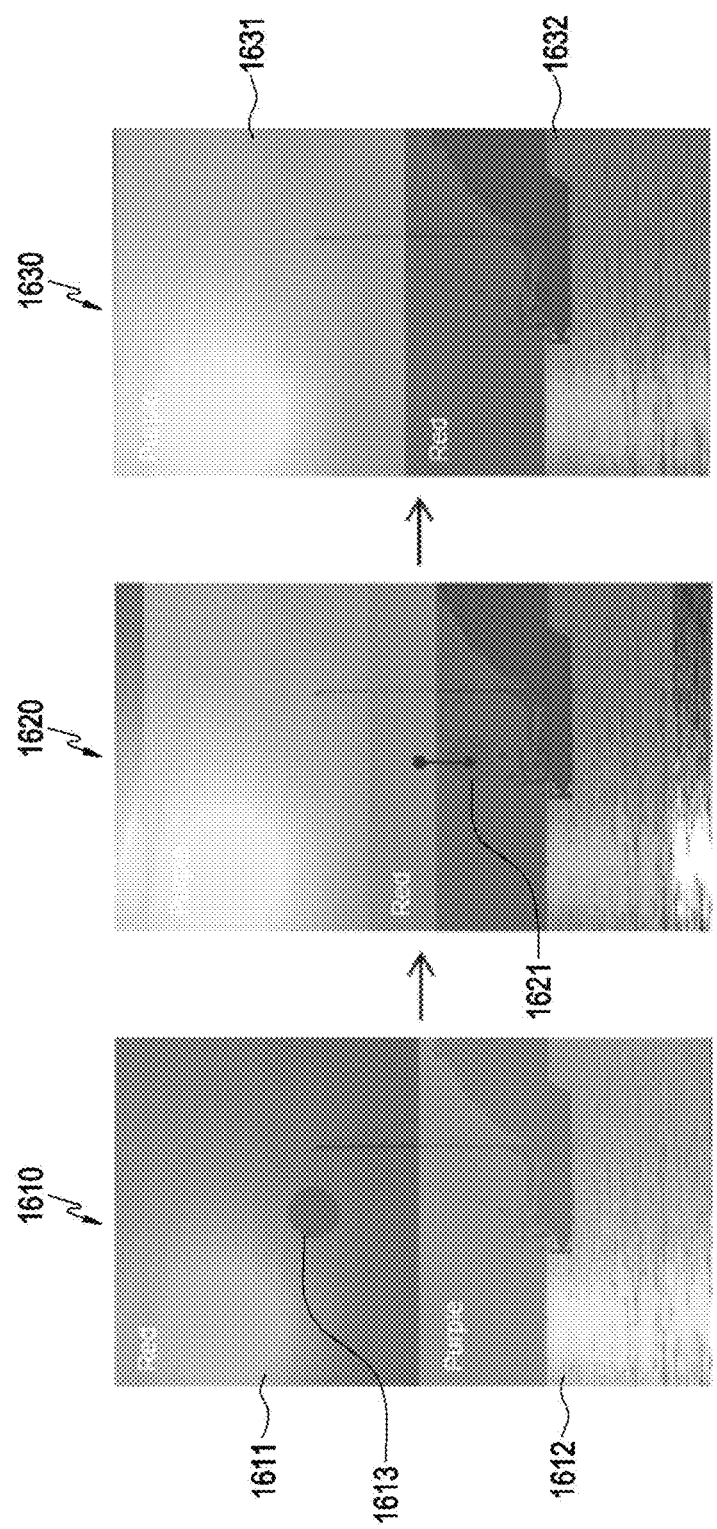

In a resulting image to which a plurality of filter effects are applied, it is possible to change the filter location in order to effectively apply the used filter effect to the image and identify the application result. For example, after selecting and holding a desired filter effect, the user may drag and drop it to the filter location that the user desires to change, thereby to change the location; FIG. 16 is a diagram illustrating this example, according to an embodiment of the present disclosure. If the user selects (1613) a red filter area in the image including a portion 1611 to which a red filter is applied and a portion 1612 to which a purple filter is applied, as in a screen 1610, and then drags and drops it to a purple filter area as in a screen 1620, the locations of a portion 1632 to which the red filter is applied and a portion 1631 to which the purple filter is applied may be changed as in a screen 1630.

Figure 17:
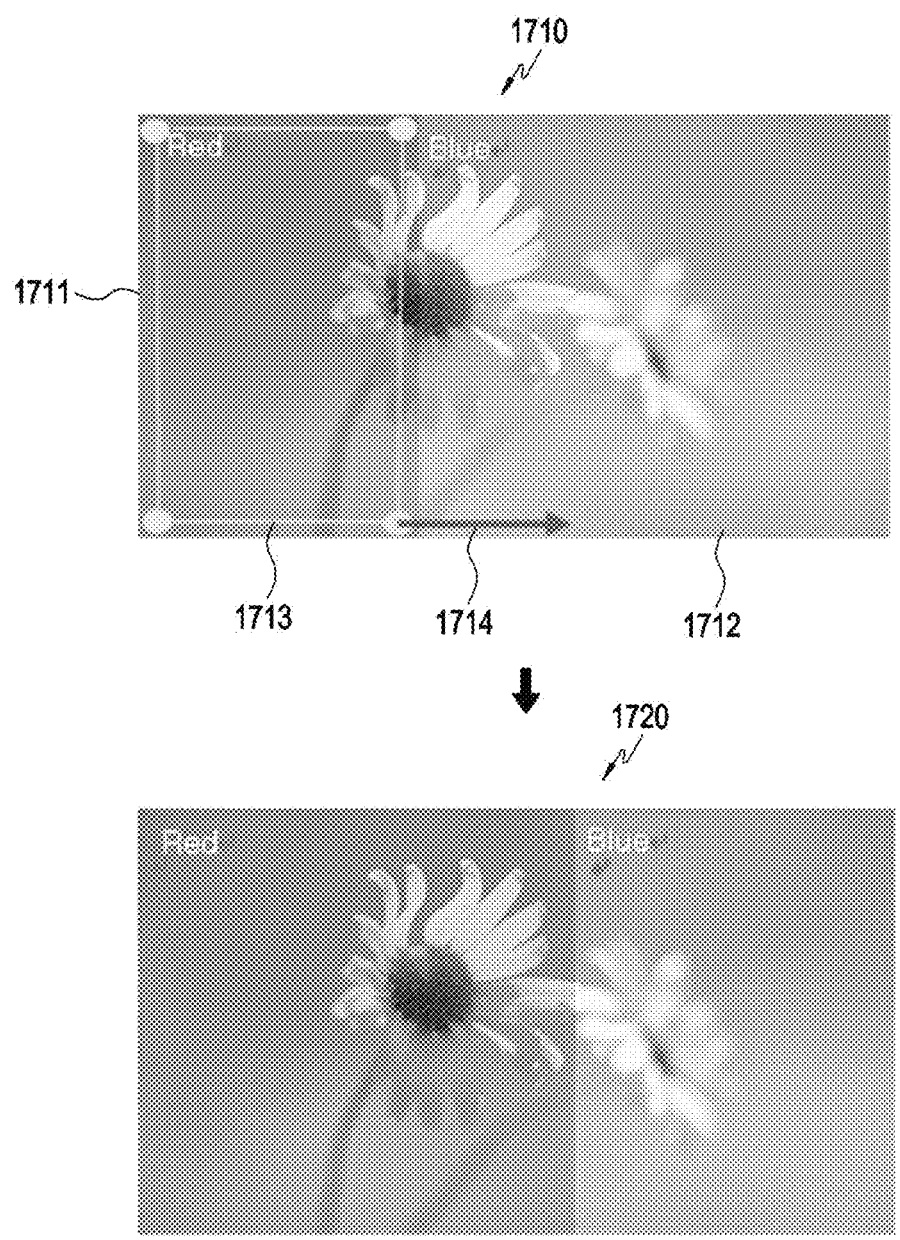

As another example, it is possible to dynamically adjust the size of the filter to be applied, on the preview screen; FIG. 17 is a diagram illustrating this example, according to an embodiment of the present disclosure. As in a screen 1710, a window 1713 for determining the size of a red filter area may be provided in the image including a red filter area 1711 and a blue filter area 1712. If the user expands (1714) the size of the window 1713, the size of the red filter area may be adjusted as in a screen 1720.

Figure 18:
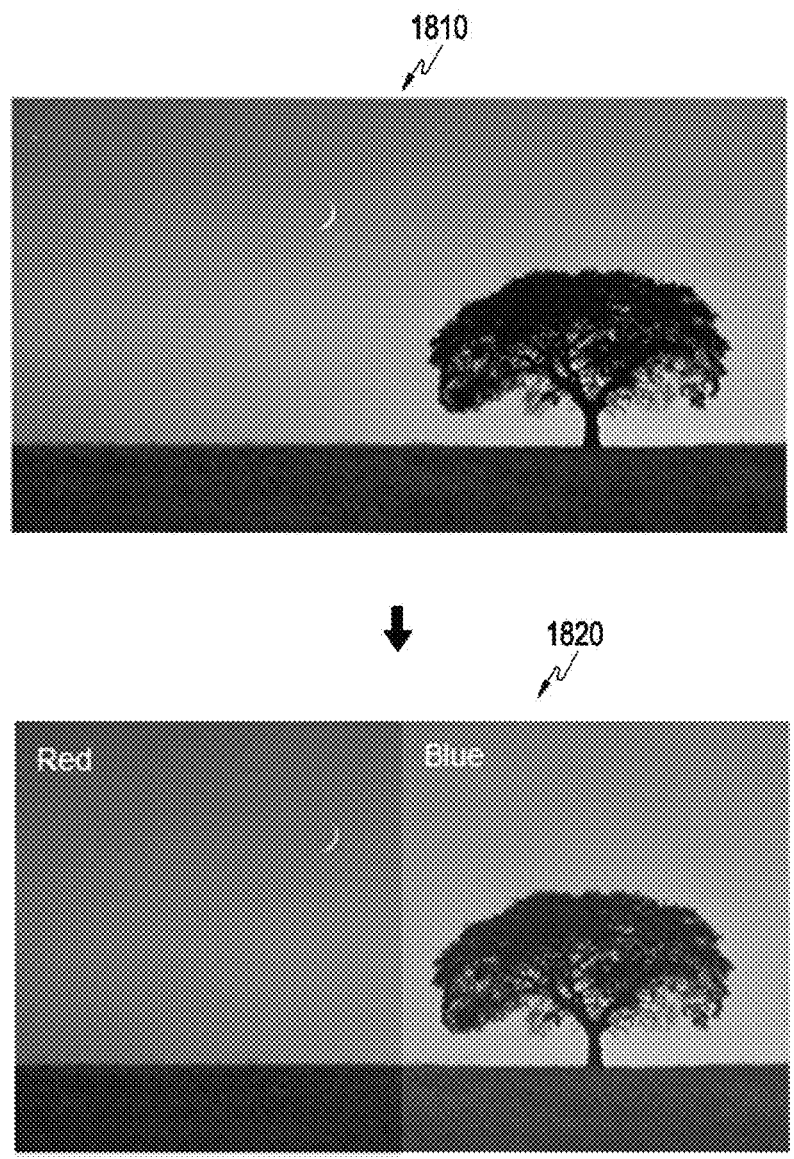
Figure 19:
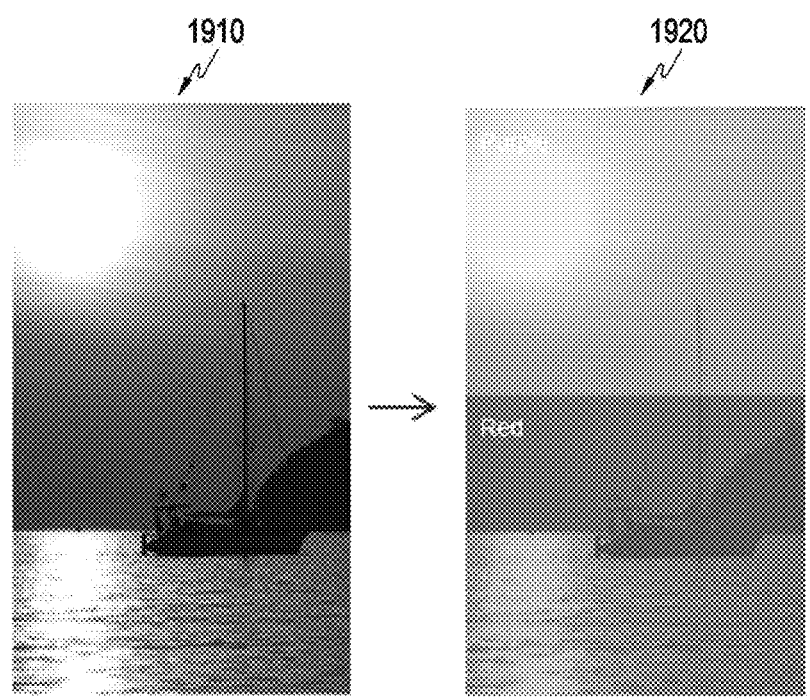

As another example, depending on the direction of the image, it is possible to recommend and display the template suitable to be applied. The filter template form (1810 and 1820) divided into left and right may be recommended for the landscape mode in FIG. 18, and the filter template form (1910 and 1920) divided into top and bottom may be recommended for the portrait mode in FIG. 19.

Figure 20:
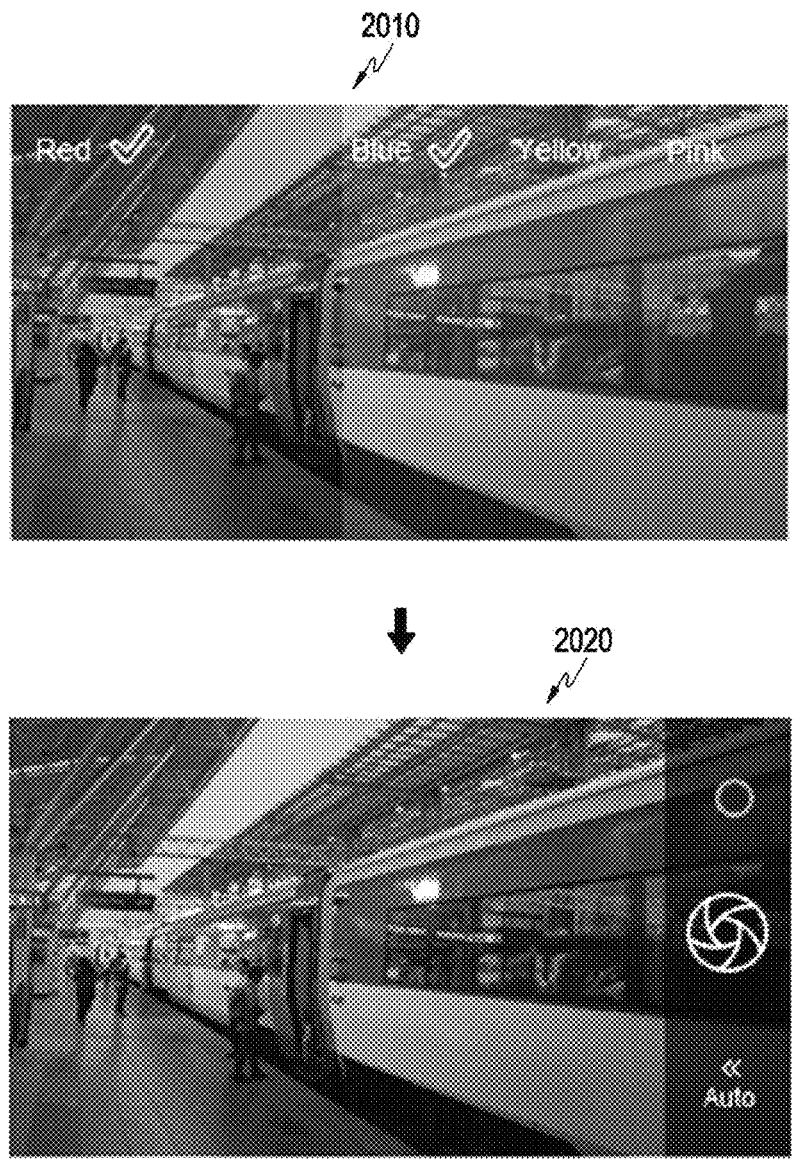
Figure 21:
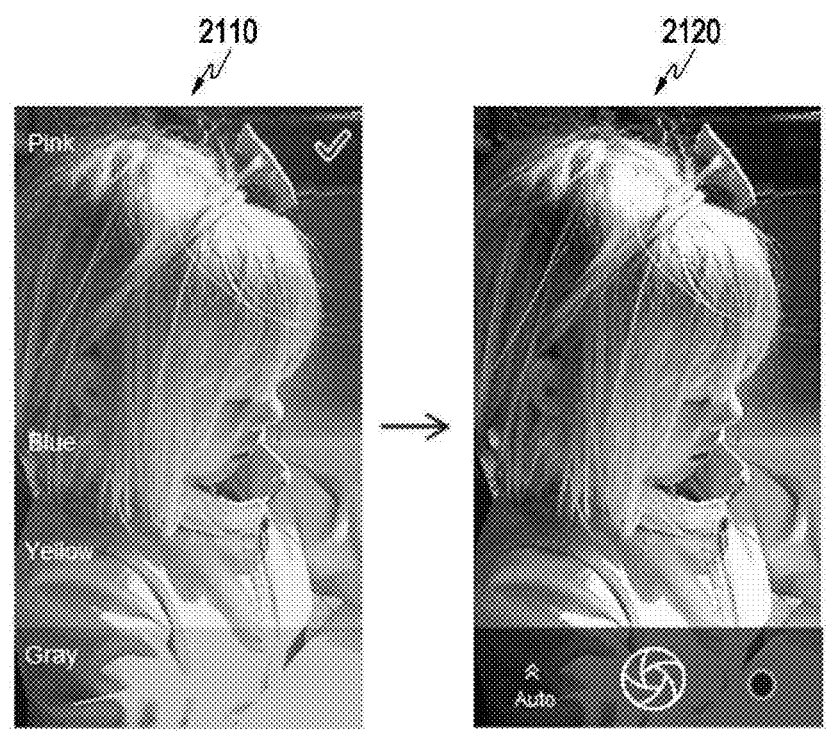

FIGS. 20 and 21 are diagrams illustrating examples in which only the same color as that of the filter effect among the colors of the image is maintained, according to an embodiment of the present disclosure. If a blue filter and a red filter are selected as in a screen 2010 in FIG. 20, a resulting image in which only the blue and red colors are expressed in color as may be provided in a screen 2020. If a pink filter is selected as in a screen 2110 in FIG. 21, a resulting image may be provided as in a screen 2120.

Figure 22:
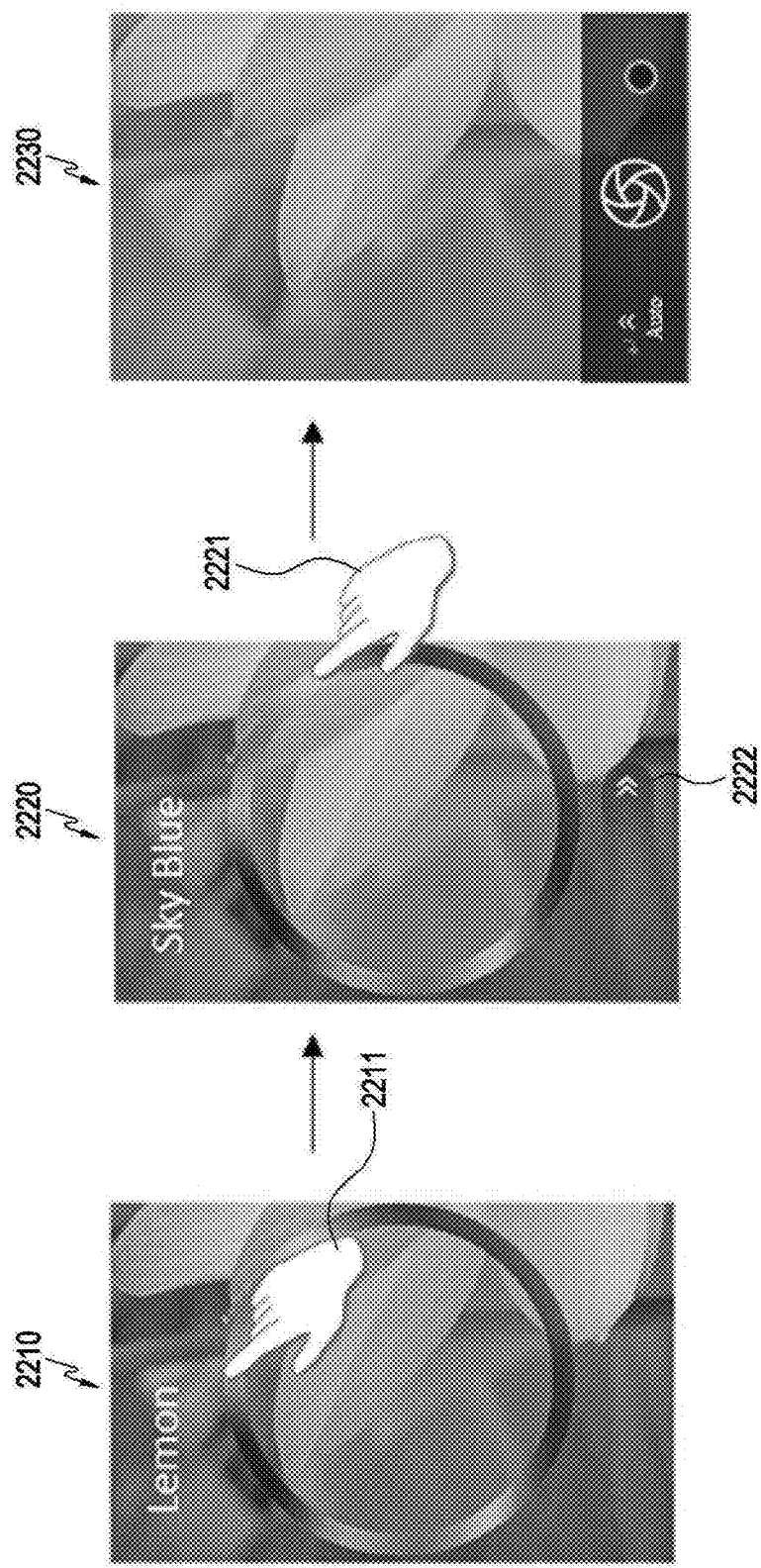

As another example, it is possible to provide a filter effect in the form of a border of a closed shape, and display the result in which a selected filter effect is applied to the inside of the closed shape; FIG. 22 is a diagram illustrating this example, according to an embodiment of the present disclosure. If a lemon filter is selected (2211) while a circular color filter effect are displayed as in a screen 2210 in FIG. 22, the lemon filter may be applied to the inside of the circular color filter effect. If a sky blue filter is selected (2221) as in a screen 2220, the sky blue filter may be applied to the inside of the circular color filter effect. The color in which the filter effect is applied may be applied not only inside the circle, but also outside the circle. Thereafter, if there is a final select input 2222, a resulting image may be provided as in a screen 2230.

Figure 23:
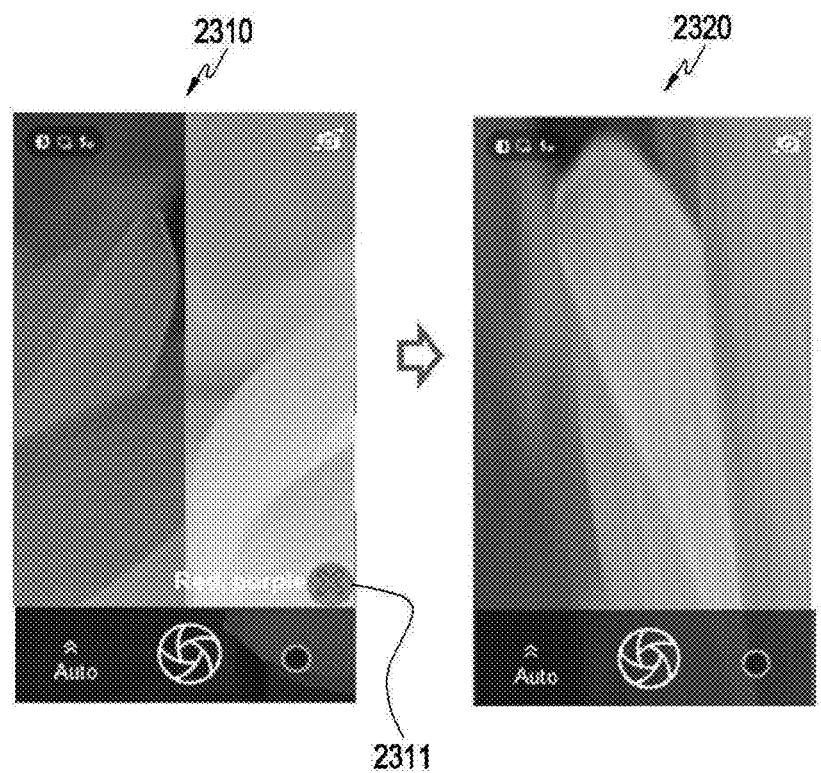
FIG. 23 is a diagram illustrating a filter effect removed screen, according to an embodiment of the present disclosure.

As for canceling application of a filter effect, the application may be easily canceled through an 'X' button 2311 or 'Remove Effect' button on the bottom of a screen 2310 in FIG. 23. In another method, the filter effect may be removed in the opposite action of the user gesture to apply a filter effect. For example, if the user has entered the filter effect through 'right swipe', the user may remove the filter effect through 'left swipe'.

The filter effect may be removed through a separate removal action in a user experience (UX) way. However, when it comes to an action method, it is equivalent to applying one filter. In other words, if the user selects and sets "NONE" indicating that there is no selected filter, the filter being used may be removed and the original image may be displayed.

It is possible to recommend and display filter effects depending on the latest filters, the fashion filters, the friend recommends and the user used pattern. As for viewing the recommended filters, it is possible to automatically download and display preview versions from the filter store. For the preview versions, it is possible to identify the filter effects only in the filter list area (e.g., a partial area of the preview image), and it is also possible to apply preview filter areas. However, in terms of policy, the filter effects may not be applied during full application or shooting, and in a case where the user has purchased the filter effects, the user may obtain the result to which the filter effects are applied. A preview-version filter effect means a filter effect in which the filter effect applied in a preview image is the same, but the filter effect cannot be identified in the shooting and entire resulting image due to the policy restrictions. For a preview filter, it is possible to download several preview-version filter effects that are provided from the server during download or update of a camera application, or at the service access time.

A method of an installed preview-version filter effect may operate such as equally displaying a list on the preview image and partially applying the list. However, in the resulting image to which the shooting time or the overall effect is applied, a 'Not-Applicable' message may be displayed and no effect may be applied.

Thereafter, if the user selects to download a filter, the electronic device may transfer information about the filter to the server to request download of a formal version of the preview-version filter. Thereafter, an operation of finding the formal version of the filter package by the server and downloading installing the downloaded formal version in the terminal may be performed in the same way as the operation of the preview filter.

Figure 24:
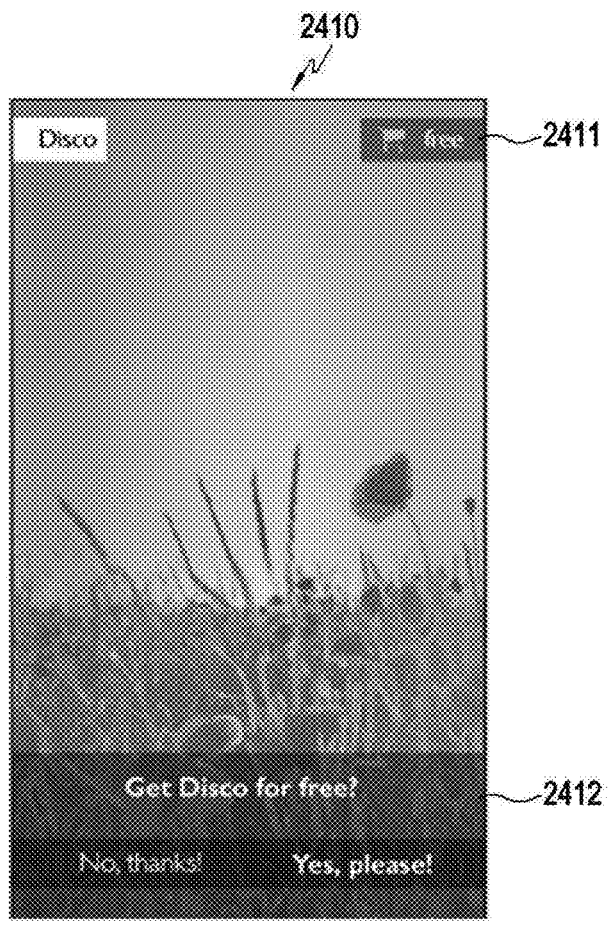
FIGS. 24 and 25 are diagrams illustrating a filter effect purchase process, according to an embodiment of the present disclosure.

The filter effects may be configured so as not to be applicable during actual shooting. When the user takes a picture, a filter name may be displayed on the taken picture by watermark. The screen capture may also display the same effects (watermark, hyperlink, etc.). For an image captured in a preview-version filter effect, a filter effect name and purchase information 2411 and 2412 may be displayed in an image gallery as in a screen 2410 in FIG. 24, guiding the download.

For the user preferred filter effect, a comment may be written, and shared with other users. When photos are shared in the image gallery, the filter names and links applied in the photos may also be shared.

A purchased filter may not be used if its set period expires. Further, if the number of times that the filter can be applied is set, and the filter has been used a predetermined number of times or more, the filter may be newly purchased.

Figure 25:
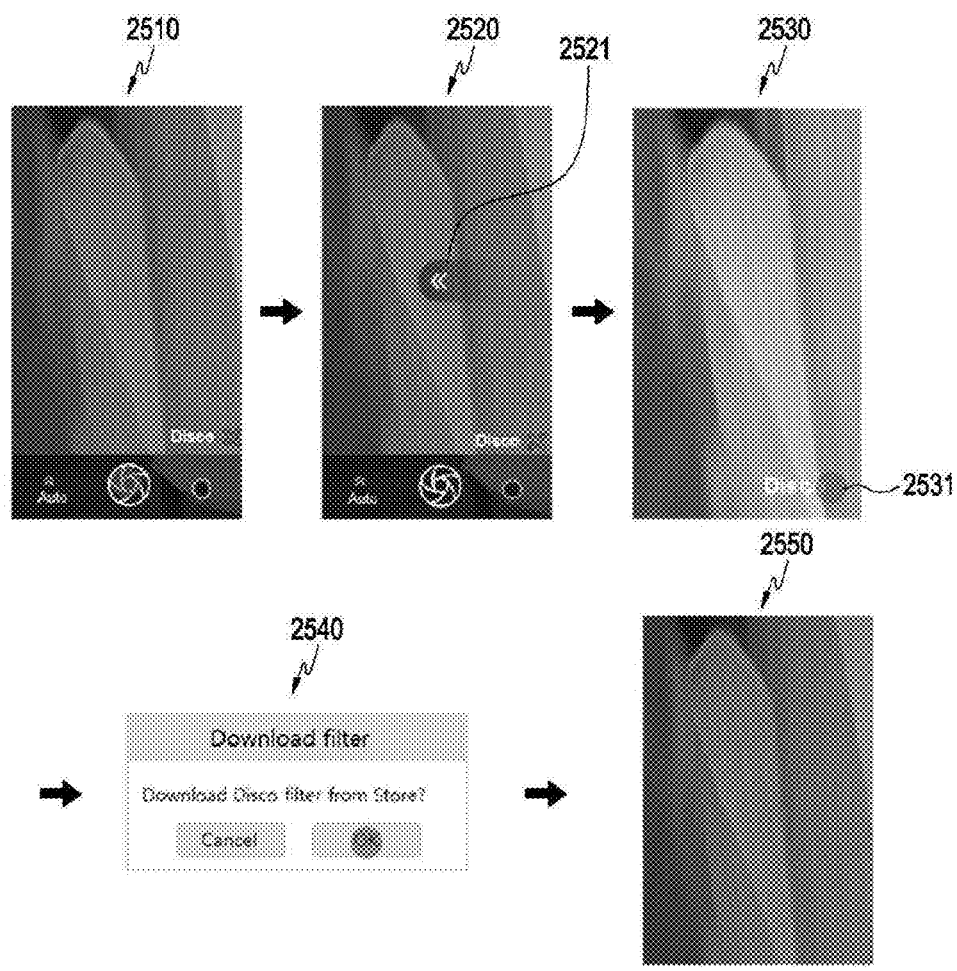

FIG. 25 is a diagram illustrating a purchase process during shooting with a preview-version filter effect, according to an embodiment of the present disclosure. A screen 2510 represents an image captured with a preview filter effect, and a filter effect name may be included in the image. In this state, if there is a gallery entry request 2521 as in a screen 2520, the image including the filter effect name may be displayed as in a screen 2530. If there is an input 2531 to select the filter effect name, a download guidance message 2540 may be provided, and during the download, a resulting image from which the filter effect name is removed may be provided as in a screen 2550.

Figure 26:
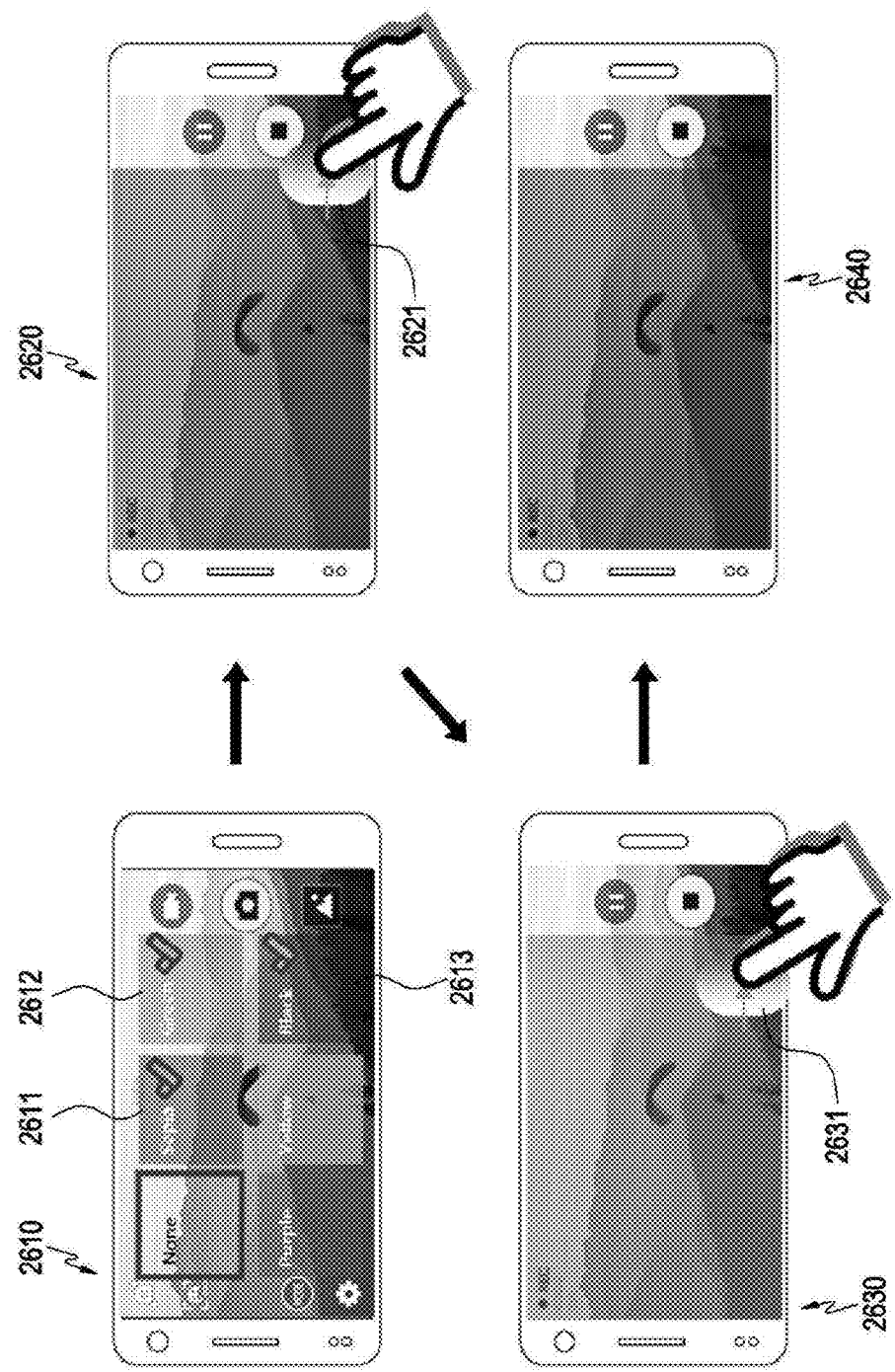
FIGS. 26-31 are diagrams illustrating application of filter effects to video, according to an embodiment of the present disclosure.

After selecting a plurality of filters, the user may quickly select and apply, during shooting, the filter that the user has selected with the left/right swipe after starting video shooting. FIG. 26 is a diagram illustrating a process of selecting a plurality of filters, according to an embodiment of the present disclosure, and then quickly select and apply, during shooting, the filter that the user has selected with the left/right swipe without a separate filter selection process after starting video shooting. Referring to FIG. 26, after selecting a plurality of filter effects 2611, 2612 and 2613 on a filter effect list in operation 2610, if the user plays a video as in operation 2620, a video to which a sepia filter is applied may be played. In this state, if there is a swipe input 2621, the filter may be switched to a green filter as in operation 2630, and if there is a swipe input again, the filter may be switched to a black filter as in operation 2640.

Figure 27:
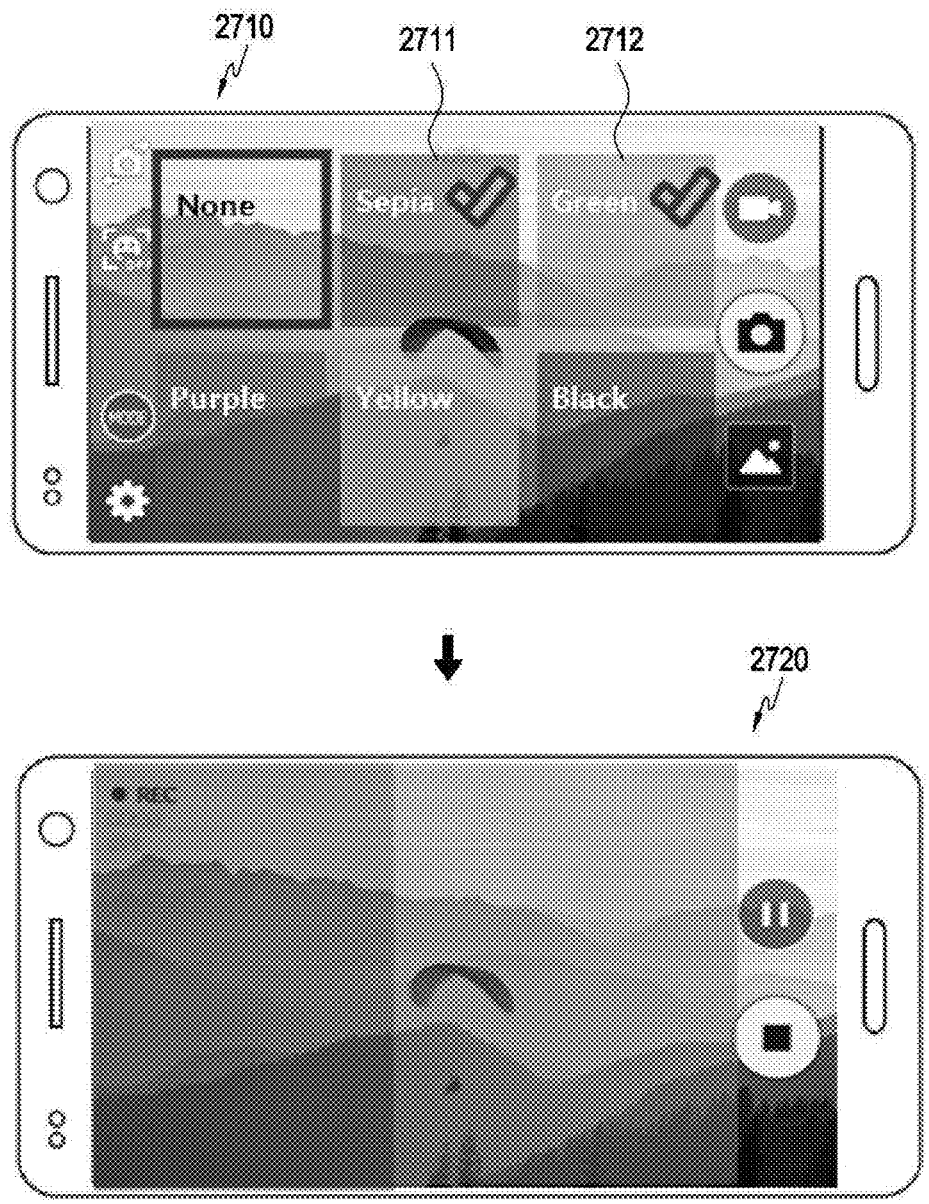

FIG. 27 is a diagram illustrating a process of playing a video, to which a plurality of filter effects are applied at the same time, according to an embodiment of the present disclosure. If the user selects a plurality of filter effects 2711 and 2712 and sets concurrent application as in operation 2710, a video to which all of the selected filter effects are applied may be played or shot as in operation 2720. This is one video, but when the user plays the video, it is possible to obtain an effect of selecting and playing each of the filters to store a plurality of videos. In this case, it is possible to separately store a plurality of videos during video shooting, or it is possible to generate resulting videos through a process of shooting one original video and then applying a plurality of filter effects thereto.

Figure 28:
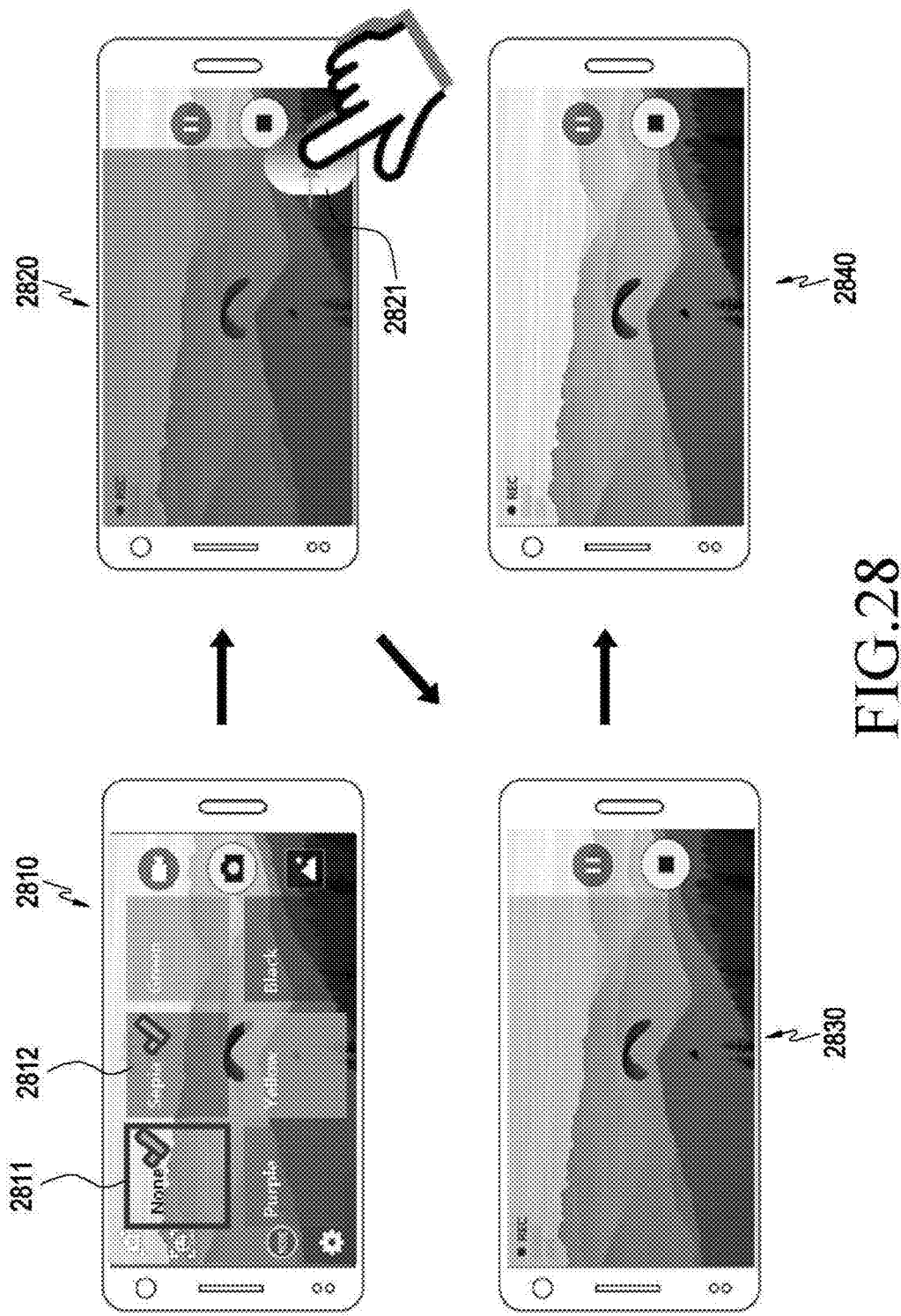

FIG. 28 is a diagram illustrating an example of applying a plurality of filter effects at regular time interval, according to an embodiment of the present disclosure. For example, it is possible to turn on the fade mode and set a fade time with [Filter Fade: ON] and [Fade time: 5]. In this way, when the filters are changed, the filters may not be changed at once, but the filters may be slowly switched over several seconds, providing a natural filter effect. Referring to FIG. 28, after the user selects a plurality of filter effects 2811 and 2812 and sets a fade time in operation 2810, if there is a switching input 2821 during video shooting with a sepia filter as in operation 2820, the filters may be slowly switched for the set fade time as in operation 2830, and if the set fade time expires, the filters may be fully switched to no-filter as in operation 2840.

Figure 29:
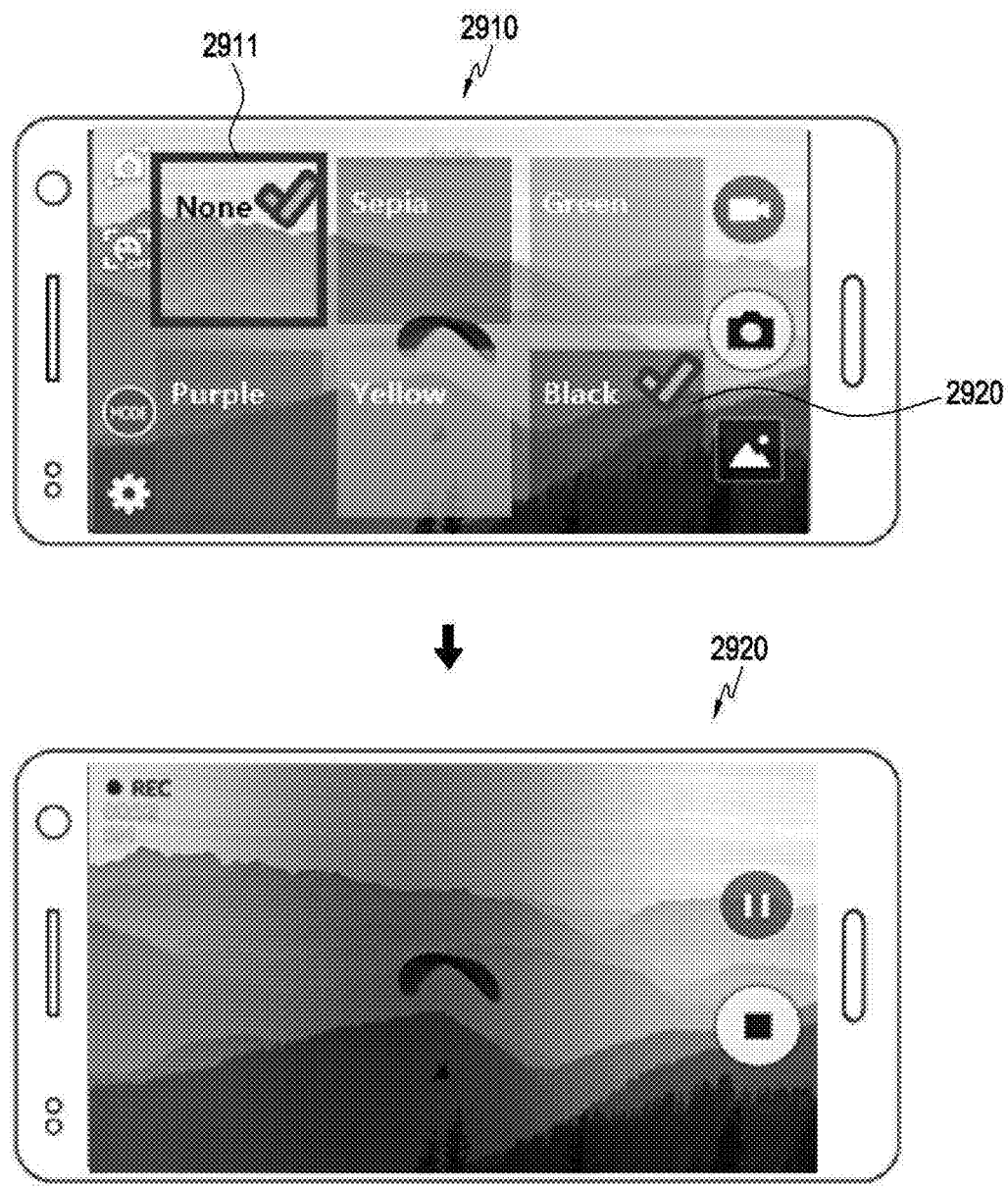

FIG. 29 is a diagram illustrating an example of applying the gradation function as various effects of a filter, according to an embodiment of the present disclosure. For example, if the user selects a plurality of filters 2911 and 2912 and sets the gradation function to [Gradation: On] as in operation 2910, the gradation function may be applied as in operation 2920.

Figure 30:
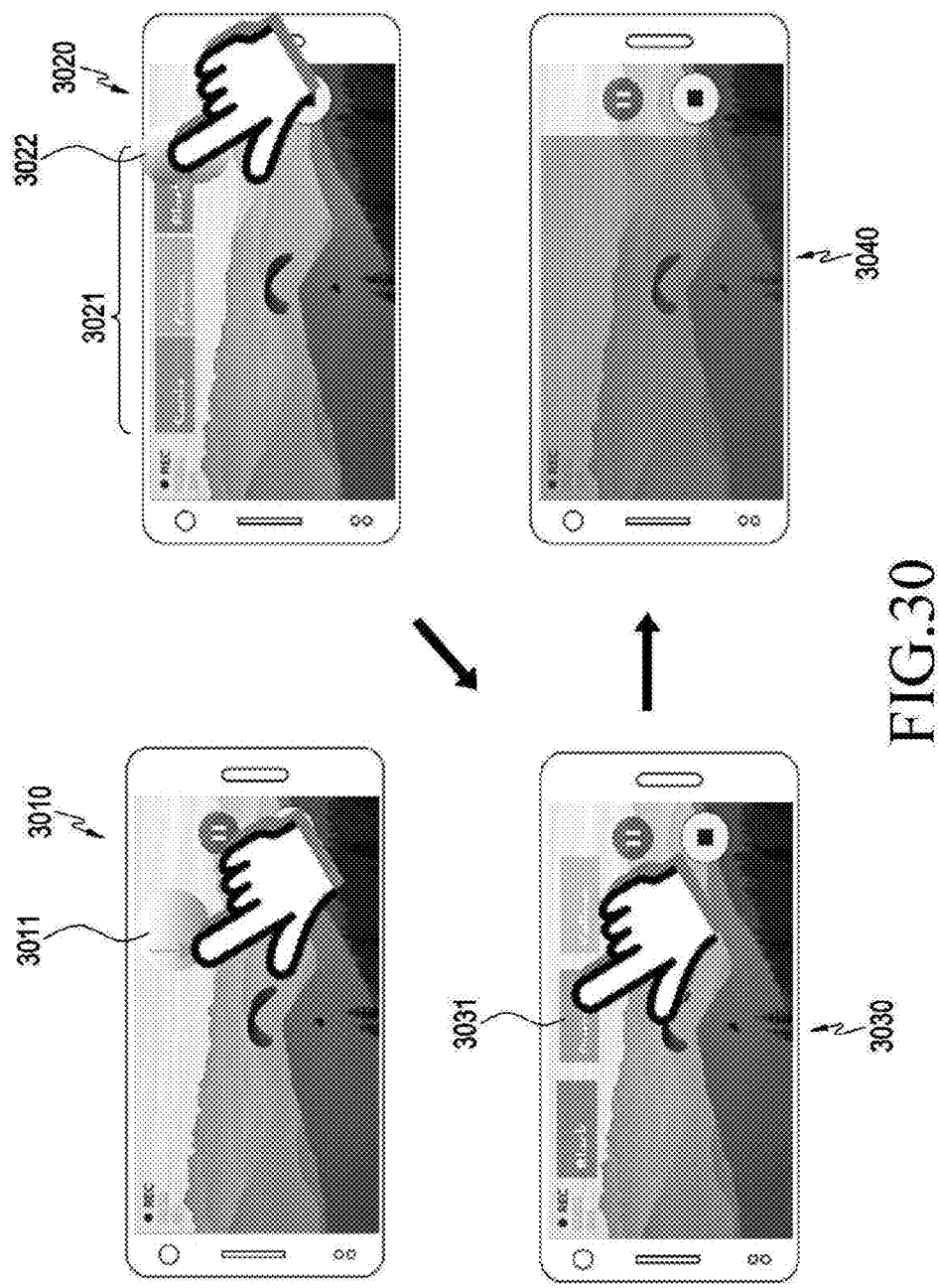

It is possible to apply the filter effect during video shooting without setting the filter in advance; FIG. 30 is a diagram illustrating this example, according to an embodiment of the present disclosure. If there is an input 3011 for a filter effect list request during video shooting as in operation 3010, a filter effect list may be displayed as in operation 3020. If there is an input 3022 for filter effect search, a filter effect list may be scrolled as in operation 3030. If there is an input 3031 for filter effect selection, the selected filter effect may be applied to the video being shot as in operation 3040.

Figure 31:
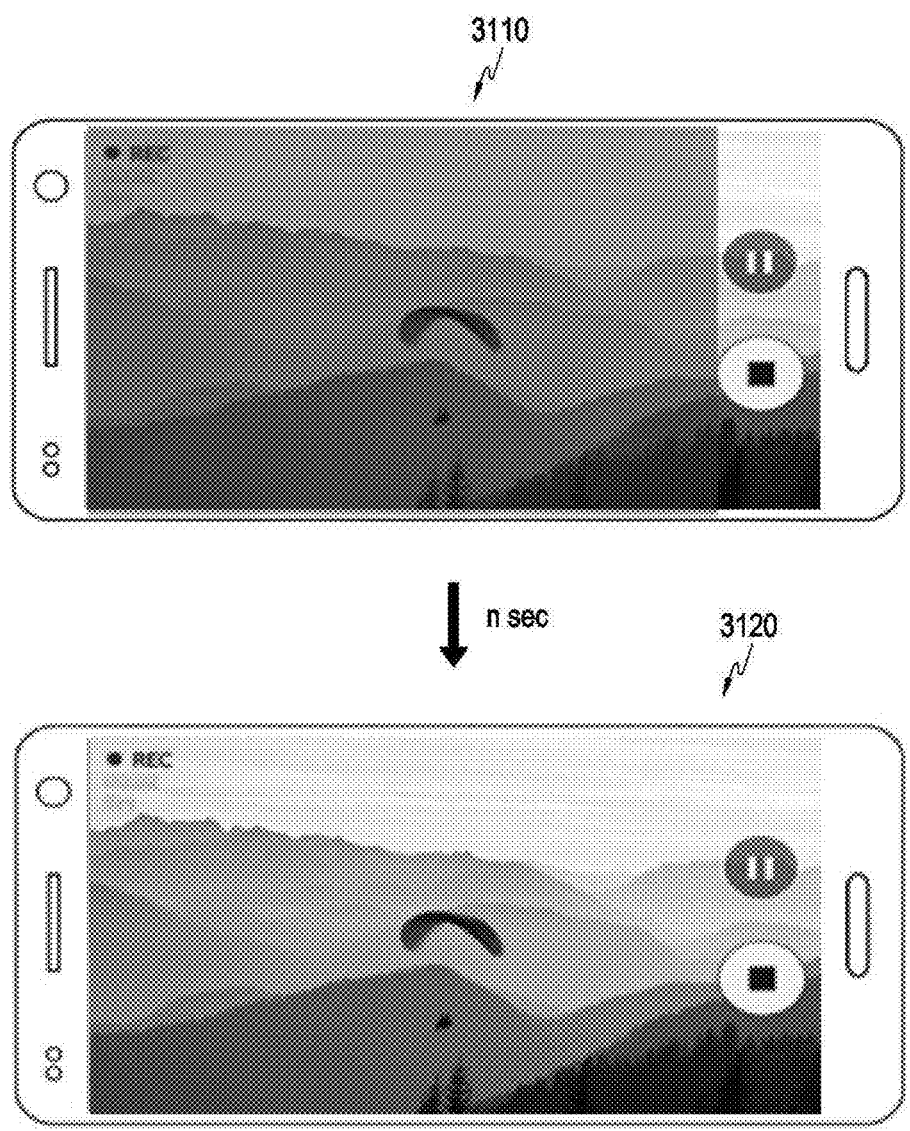

As another example, as shown in FIG. 31, the interval in which the filter effect is applied may be set. For example, if [Time interval] is set during setting, the filter effect may be automatically turned on/off as in operations 3110 and 3120. When the time interval is used together with the fade mode, it is possible to produce various effects in which the screen is slowly brightened and darkened.

The electronic device 201 and the wearable device may preview the filter effect in each device in conjunction with each other, so the user may select the filter effect by comparing the filter effects. As one device displays a filter effect list and another device displays images to which filter effects are applied, the user may conveniently compare and select the filter effects.

Figure 32:
FIGS. 32-35 are diagrams illustrating examples of applying filter effects in a wearable device and an electronic device, according to an embodiment of the present disclosure.

FIG. 32 is a diagram illustrating an example in which the original image is displayed on a wearable device 3210 and the image to which the filter effect is applied is displayed on an electronic device 3220, according to an embodiment of the present disclosure. By displaying the image to which the filter effect is applied, on the electronic device 3220 and the original image on the wearable device 3210, or displaying the images in the opposite ways, it is possible for the user to simultaneously identify the atmosphere of the filter effect and the atmosphere of the original image. In other words, one device may provide a preview and another device may provide a controlled filter effect.

Figure 33:
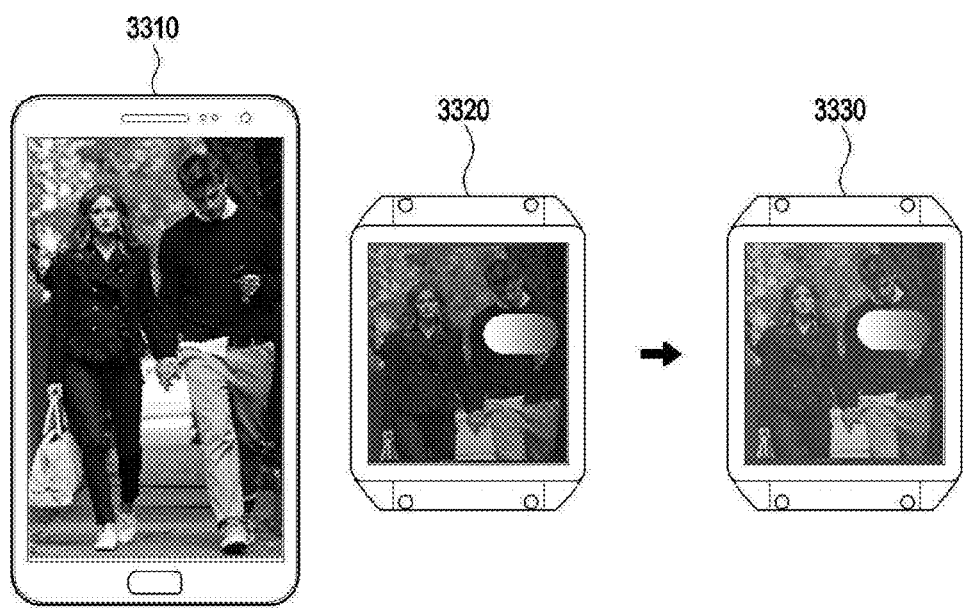

FIG. 33 is a diagram illustrating an example of replacing filters in any one device, according to an embodiment of the present disclosure. When shooting by fixing an electronic device 3310 in advance, the user may replace (3320 and 3330) the filter effects through a flick input, using the wearable device.

Figure 34:
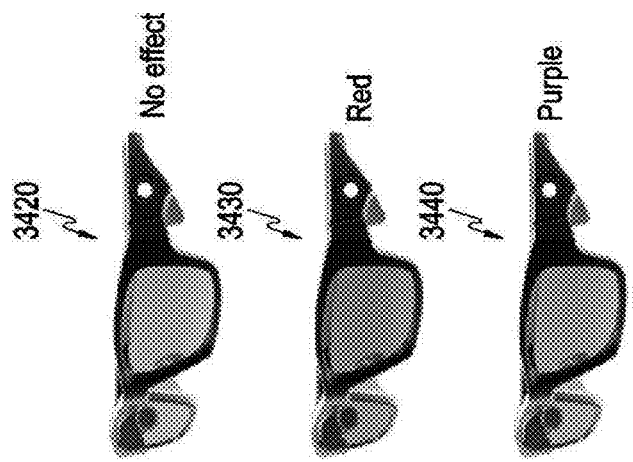
Figure 34:
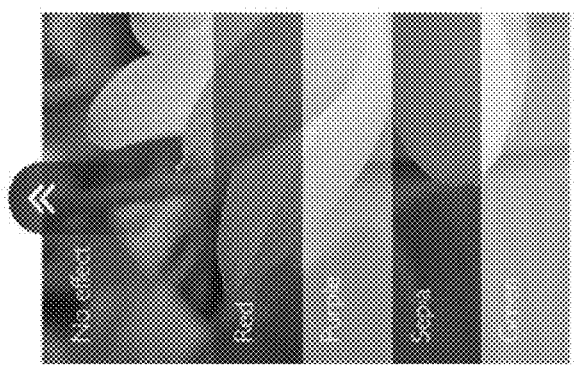

FIG. 34 illustrates a process of selecting a filter effect by a glasses-type wearable device and an electronic device in conjunction with each other, according to an embodiment of the present disclosure. Referring to FIG. 34, while the electronic device 201 is providing a screen 3410 on which a preview image is displayed, the filter effect selected by the user may be applied to glasses 3420, 3430 and 3440 of the glasses-type wearable device through wireless communication. On the contrary, it is possible to preview the filter effect by sweeping the sensor mounted on the glass frame of the glasses-type wearable device and select the filter by pressing the sensor.

Figure 35:
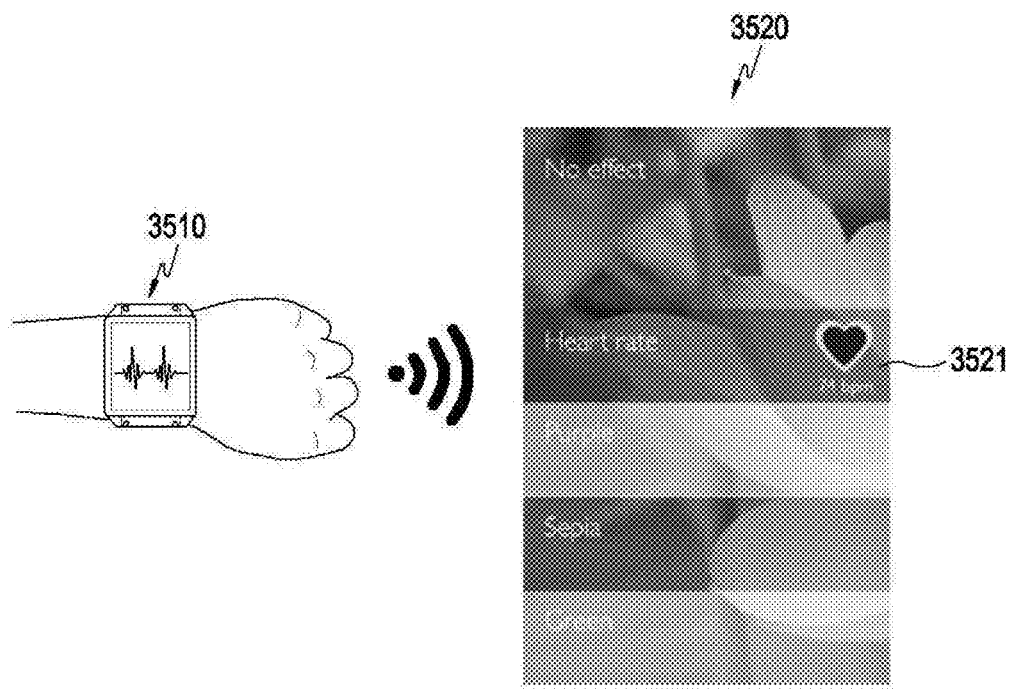

FIG. 35 illustrates an example of interworking between electronic devices with a heart beat sensor, such as an electronic device 201 and a smart watch 3510, according to an embodiment of the present disclosure. While the two devices are being connected through wireless communication, the filter effect may be selected depending on the user's heart rate. If the heart rate measured in the smart watch 3510 is transmitted to the electronic device 201, the electronic device 201 may select (3521) the corresponding filter effect as in a screen 3520 depending on the heart rate. For example, a red filter may be selected and applied to the image, for a high heart rate, and a blue filter may be selected and applied to the image, for a low heart rate.

Figure 36:
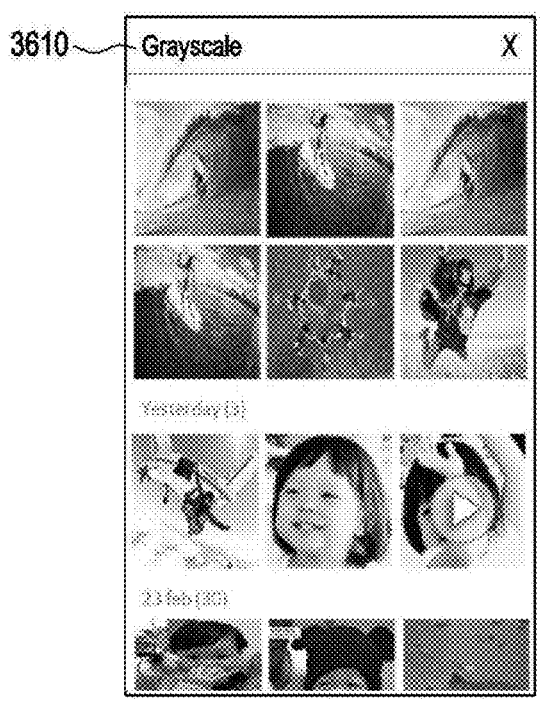
FIG. 36 is a diagram illustrating an image search screen, according to an embodiment of the present disclosure.

As shown in FIG. 36, if a specific filter effect is applied, the corresponding filter information may be included in the metadata, and photo files may be searched based thereon.

An example of displaying various effects on the preview screen by shooting filter effects has been described in various embodiments given up to now, but this is not limited to the filter effects and may be applied similarly to the shooting modes in a similar manner to that of the filter. In this case (e.g., beauty & dual camera Mode concurrent preview), there may be a separate framework (e.g., mode managing framework) for showing the effect of the shooting mode corresponding to the filter framework operation in a preview way, or the multimedia framework may include the corresponding function.

In expressing a filter effect list, it is possible to use software (SW) filters in order to display the filter effect list on the preview screen, but if there is a hardware (HW) filter that is more optimized than the selected SW filter, it is possible to switch to the HW filter during application of the effects. In this case, there is a way to separately configure a corresponding mapping table between the SW filter and the HW filter, and provide an option to notify the user of the intended filter exchange or to select the filter exchange. Further, when applying the HW filter unlike the SW filter, it is possible to perform shooting in the manner of first applying the filter and then proceeding with the capturing.

Each of the above-described components of the electronic device may be configured with one or more components, names of which may vary depending on the type of the electronic device. The electronic device may include at least one of the above-described components, some of which may be omitted, or may further include additional other components. Further, some of the components of the electronic device may be configured as one entity by being combined, thereby performing the previous functions of the components in the same manner.

At least a part of the apparatus (e.g., modules or functions thereof) or method (e.g., operations) may, for example, be implemented by an instruction that is stored in a non-transitory computer-readable storage media in the form of a program module. If the instruction is executed by the processor 120, the processor 120 may perform a function corresponding to the instruction. The non-transitory computer-readable storage media may be, for example, the memory 130.

The non-transitory computer-readable storage media may include magnetic media (e.g., a hard disk, a floppy disk, and magnetic tape), optical media (e.g., a compact disc read only memory (CD-ROM) and a digital versatile disc (DVD)), magneto-optical media (e.g., a floptical disk), and a hardware device (e.g., a read only memory (ROM), a random access memory (RAM) or a flash memory). A program instruction may include not only a machine code such as a code made by a compiler, but also a high-level language code that can be executed by the computer using an interpreter. The above-described hardware device may be configured to operate as one or more software modules to perform the operations according to various embodiments of the present disclosure, and vice versa.

A module or a program module may include at least one of the above-described components, some of which may be omitted, or may further include additional other components. Operations performed by a module, a program module or other components may be performed in a sequential, parallel, iterative or heuristic way. Some operations may be performed in a different order or omitted, or other operations may be added. Embodiments disclosed herein have been presented for description and understanding of the technical details, but it is not intended to limit the scope of the present disclosure. Therefore, the scope of the present disclosure should be construed to include all changes or various other embodiments based on the technical spirit of the present disclosure.

As is apparent from the foregoing description, by providing a more accurate preview for a filter effect for an image, it is possible to improve the user satisfaction for a resulting image to which the actual filter effect is applied. Further, multiple filter effects may be utilized to fit user's intent, contributing to the increased user experience and convenience. Further, it is possible to provide a preview for a filter effect before its purchase.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method for displaying an image in an electronic device, the method comprising:
    displaying an image; and
    if a filter effect list request is input, dividing at least a portion of the image into a plurality of filter areas, and displaying a preview image in which different filter effects are applied to the plurality of filter areas,
    wherein dividing at least the portion of the image into the plurality of filter areas comprises:
        generating a filtered image corresponding to each of a plurality of different filter effects by applying each of the plurality of different filter effects to the image;
        setting a filter effect list layer on the image; and
        dividing the filter effect list layer into the plurality of filter areas, and
    wherein displaying the preview image in which different filter effects are applied to the plurality of filter areas comprises:
        extracting image data corresponding to each of the plurality of filter areas from a different filtered image; and
        generating and displaying the preview image by combining the extracted image data.

2. The method of claim 1, further comprising:
    if a select and apply request for at least one of the plurality of filter areas is received, applying a filter effect corresponding to the at least one filter area to the entire image and displaying a resulting image.

3. The method of claim 1, wherein dividing at least the portion of the image into the plurality of filter areas comprises:
    setting a filter effect list layer on the image;
    dividing the filter effect list layer into the plurality of filter areas,
    wherein displaying the preview image in which different filter effects are applied to the plurality of filter areas comprises:
    extracting image data corresponding to each of the plurality of filter areas from the image;
    applying the different filter effect to each of the extracted image data to convert the image data; and
    generating and displaying the preview image by combining the converted image data.

4. The method of claim 1, further comprising:
    if a select and apply request for at least one of the plurality of filter areas is received, determining whether a filter effect corresponding to the at least one filter area is a filter effect of a preview version;
    if the filter effect corresponding to the at least one filter area is the filter effect of the preview version, providing 'Not-Applicable' information; and
    if a purchase request for the filter effect of a preview version is received, downloading a filter effect of a formal version for the at least one filter effect.

5. The method of claim 1, further comprising:
    if a detailed view request for at least one of the plurality of filter areas is received, providing a sub filter effect of a filter effect corresponding to the at least one filter area by expanding the at least one filter area.

6. The method of claim 1, further comprising:
    if at least two of the plurality of filter areas are selected and a shooting request is received, capturing an image and applying each filter effect corresponding to each of the two selected filter areas to the captured image, to generate a plurality of resulting images.

7. The method of claim 1, further comprising:
    if at least two of the plurality of filter areas are selected and a shooting request is received, continuously capturing as many images as the number of selected filter areas, and applying a filter effect corresponding to each of the two selected filter areas to each of the captured images, to generate a plurality of resulting images.

8. The method of claim 1, further comprising:
    if at least two of the plurality of filter areas are selected and a video shooting request is received, generating video to which filter effects corresponding to the selected two filter areas are applied.

9. The method of claim 1, wherein the preview image is provided in the electronic device and a resulting image is provided in a wearable device connected to the electronic device.

10. An electronic device comprising:
    a display; and
    a processor configured to:
        display an image on the display;
        if a filter effect list request is input, divide at least a portion of the image into a plurality of filter areas; and
        display a preview image in which different filter effects are applied to the plurality of filter areas,
    wherein the processor is further configured to generate a filtered image corresponding to each of a plurality of different filter effects by applying each of the plurality of different filter effects to the image, set a filter effect list layer on the image, divide the filter effect list layer into the plurality of filter areas, extract image data corresponding to each of the plurality of filter areas from a different filtered image, and generate and display the preview image by combining the extracted image data.

11. The electronic device of claim 10, wherein if a select and apply request for at least one of the plurality of filter areas is received, the processor is further configured to apply a filter effect corresponding to the at least one filter area to the entire image and display a resulting image.

12. The electronic device of claim 10, wherein the processor is further configured to set a filter effect list layer on the image, divide the filter effect list layer into a plurality of filter areas, extract image data corresponding to each of the plurality of filter areas from the image, apply the different filter effect to each of the extracted image data to convert the image data, and generate and display the preview image by combining the converted image data.

13. The electronic device of claim 10, wherein the processor is further configured to:
    if a select and apply request for at least one of the plurality of filter areas is received, determine whether a filter effect corresponding to the at least one filter area is a filter effect of a preview version;
    if the filter effect corresponding to the at least one filter area is the filter effect of the preview version, provide 'Not-Applicable' information; and
    if a purchase request for the filter effect of a preview version is received, download a filter effect of a formal version for the at least one filter effect.

14. The electronic device of claim 10, wherein if a detailed view request for at least one of the plurality of filter areas is received, the processor provides a sub filter effect of a filter effect corresponding to the at least one filter area by expanding the at least one filter area.

15. The electronic device of claim 10, wherein if at least two of the plurality of filter areas are selected and a shooting request is received, the processor captures an image and applies each filter effect corresponding to each of the two selected filter areas to the captured image, to generate a plurality of resulting images.

16. The electronic device of claim 10, wherein if at least two of the plurality of filter areas are selected and a shooting request is received, the processor continuously captures as many images as the number of selected filter areas, and applies a filter effect corresponding to each of the two selected filter areas to each of the captured images, to generate a plurality of resulting images.

17. The electronic device of claim 10, wherein if at least two of the plurality of filter areas are selected and a video shooting request is received, the processor generates video to which filter effects corresponding to the two selected filter areas are applied.

18. The electronic device of claim 11, wherein the preview image is provided in the electronic device and the resulting image is provided in a wearable device connected to the electronic device.

* * * * *